(12) United States Patent
Shmaiser et al.

(10) Patent No.: US 11,806,997 B2
(45) Date of Patent: Nov. 7, 2023

(54) INDIRECT PRINTING SYSTEM AND RELATED APPARATUS

(71) Applicant: LANDA CORPORATION LTD., Rehovot (IL)

(72) Inventors: Aharon Shmaiser, Rishon LeZion (IL); Haggai Karlinski, Ramat Gan (IL); Alon Siman-Tov, Or Yehuda (IL); Yehoshua Sheinman, Ra'anana (IL); Daniel Alkhanati, Nes Ziona (IL); Elad Pur Buchray, Nes Ziona (IL)

(73) Assignee: LANDA CORPORATION LTD., Rehovot (IL)

(*) Notice: Subject to any disclaimer, the term of this patent is extended or adjusted under 35 U.S.C. 154(b) by 0 days.

(21) Appl. No.: 17/507,758

(22) Filed: Oct. 21, 2021

(65) Prior Publication Data

US 2022/0111633 A1 Apr. 14, 2022

Related U.S. Application Data

(63) Continuation of application No. 16/883,617, filed on May 26, 2020, now Pat. No. 11,179,928, which is a
(Continued)

(30) Foreign Application Priority Data

Apr. 14, 2015 (GB) ...................................... 1506314
Jul. 10, 2015 (GB) ...................................... 1512145

(51) Int. Cl.
*B41J 2/005* (2006.01)
*B41J 11/00* (2006.01)
(Continued)

(52) U.S. Cl.
CPC ............... *B41J 2/0057* (2013.01); *B41J 2/01* (2013.01); *B41J 11/007* (2013.01); *B41J 13/08* (2013.01);
(Continued)

(58) Field of Classification Search
CPC . B41J 2/0057; B41J 2/01; B41J 11/007; B41J 13/08; B41J 15/048; B41J 15/16;
(Continued)

(56) References Cited

U.S. PATENT DOCUMENTS

| 3,837,878 A | 9/1974 | Beers |
| 3,935,055 A | 1/1976 | Carmien |

(Continued)

FOREIGN PATENT DOCUMENTS

| CN | 1305895 A | 8/2001 |
| CN | 1543404 A | 11/2004 |

(Continued)

OTHER PUBLICATIONS

CN101096455A Machine Translation (EPO, PlatPat and Google) published on Jan. 2, 2008 Fujifilm Corp.
(Continued)

*Primary Examiner* — Ryan D Walsh
(74) *Attorney, Agent, or Firm* — Momentum IP; Marc Van Dyke

(57) ABSTRACT

Some embodiments relate to printing system is described that has an intermediate transfer member (ITM) in the form of a seamed endless belt for transporting an ink image from an image forming station, at which an ink image is deposited on ITM, to an impression station, where the ink image is transferred onto a printing substrate. Two drive members are provided for movement in synchronism with one another. Rotation of the drive members during installation of a new ITM serves to thread the strip through the printing system by
(Continued)

pulling the strip from its leading end. Alternatively or additionally, indirect printing system comprising the ITM and an image forming station at which droplets of ink are applied to the ITM to form ink images thereon is disclosed. One or more blowing mechanisms (e.g. associated with the image forming station) are disclosed herein.

16 Claims, 12 Drawing Sheets

Related U.S. Application Data continuation of application No. 16/542,362, filed on Aug. 16, 2019, now Pat. No. 10,703,094, and a continuation of application No. 16/244,145, filed on Jan. 10, 2019, now Pat. No. 10,703,093, said application No. 16/542,362 is a continuation of application No. 16/118,494, filed on Aug. 31, 2018, now Pat. No. 10,427,399, said application No. 16/244,145 is a continuation-in-part of application No. 15/741,897, filed as application No. PCT/IB2016/053049 on May 25, 2016, now Pat. No. 10,259,245, said application No. 16/118,494 is a continuation of application No. 15/564,198, filed as application No. PCT/IB2016/052120 on Apr. 4, 2016, now Pat. No. 10,226,920.

(60) Provisional application No. 62/618,680, filed on Jan. 18, 2018.

(51) Int. Cl.
*B41J 13/08* (2006.01)
*B41J 15/04* (2006.01)
*B41J 2/01* (2006.01)
*B41J 15/16* (2006.01)
*B65G 17/32* (2006.01)
*G03G 15/16* (2006.01)

(52) U.S. Cl.
CPC ............. *B41J 15/048* (2013.01); *B41J 15/16* (2013.01); *B65G 17/323* (2013.01); *G03G 15/1615* (2013.01); *B41J 2002/012* (2013.01)

(58) Field of Classification Search
CPC ............. B41J 2002/012; B65G 17/323; G03G 15/1615
See application file for complete search history.

(56) References Cited

U.S. PATENT DOCUMENTS

| | | | |
|---|---|---|---|
| 4,204,471 A | 5/1980 | Becker | |
| 4,520,048 A | 5/1985 | Ranger | |
| 4,586,807 A | 5/1986 | Yuasa | |
| 4,792,473 A | 12/1988 | Vitale | |
| 4,867,830 A | 9/1989 | Chung | |
| 5,278,199 A | 1/1994 | Ohkawa et al. | |
| 5,320,214 A | 6/1994 | Kordis | |
| 5,683,841 A | 11/1997 | Kato | |
| 5,780,412 A | 7/1998 | Scarborough et al. | |
| 5,865,299 A | 2/1999 | Williams | |
| 6,318,853 B1 | 11/2001 | Asano et al. | |
| 6,335,046 B1 | 1/2002 | Mackey | |
| 6,405,006 B1 | 6/2002 | Tabuchi | |
| 6,633,735 B2 | 10/2003 | Kellie et al. | |
| 9,207,585 B2 | 12/2015 | Iatano et al. | |
| 9,327,519 B1 | 5/2016 | Arson et al. | |
| 10,703,093 B2 * | 7/2020 | Karlinski | B41J 2/01 |
| 11,179,928 B2 | 11/2021 | Shmaiser et al. | |
| 11,214,089 B2 | 1/2022 | Landa et al. | |
| 2001/0033688 A1 | 10/2001 | Taylor | |
| 2002/0061451 A1 | 5/2002 | Kita et al. | |
| 2003/0041777 A1 | 3/2003 | Karl et al. | |
| 2003/0103128 A1 | 6/2003 | Missell et al. | |
| 2004/0105971 A1 | 6/2004 | Parrinello et al. | |
| 2004/0177779 A1 | 9/2004 | Steffen et al. | |
| 2004/0221943 A1 | 11/2004 | Yu et al. | |
| 2004/0249327 A1 | 12/2004 | Sendijarevic et al. | |
| 2004/0265016 A1 | 12/2004 | Kitani et al. | |
| 2005/0103437 A1 | 5/2005 | Carroll | |
| 2005/0117859 A1 | 6/2005 | Suzuki et al. | |
| 2006/0066704 A1 | 3/2006 | Nishida | |
| 2006/0120740 A1 | 6/2006 | Yamada et al. | |
| 2007/0025740 A1 | 2/2007 | Katoh et al. | |
| 2008/0066277 A1 | 3/2008 | Colson et al. | |
| 2008/0247780 A1 | 10/2008 | Hara | |
| 2009/0073222 A1 | 3/2009 | Hori | |
| 2009/0185204 A1 | 7/2009 | Wu et al. | |
| 2010/0035501 A1 | 2/2010 | Prudhomme et al. | |
| 2010/0123752 A1 | 5/2010 | Eun et al. | |
| 2010/0247171 A1 | 9/2010 | Ono et al. | |
| 2010/0300604 A1 | 12/2010 | Goss et al. | |
| 2011/0069110 A1 | 3/2011 | Matsumoto et al. | |
| 2011/0069117 A1 | 3/2011 | Ohzeki et al. | |
| 2011/0069129 A1 | 3/2011 | Shimizu | |
| 2011/0242181 A1 | 10/2011 | Otobe | |
| 2011/0298884 A1 | 12/2011 | Furuta | |
| 2012/0014726 A1 | 1/2012 | Sekihara et al. | |
| 2012/0236100 A1 | 9/2012 | Toya | |
| 2012/0249630 A1 | 10/2012 | Bugner et al. | |
| 2012/0314013 A1 | 12/2012 | Takemoto et al. | |
| 2013/0096871 A1 | 4/2013 | Takahama | |
| 2013/0182045 A1 | 7/2013 | Ohzeki et al. | |
| 2013/0229457 A1 * | 9/2013 | Yu | B41J 2/1714 347/25 |
| 2013/0235139 A1 | 9/2013 | Schnabel et al. | |
| 2014/0168313 A1 * | 6/2014 | Ramesh | B41J 2/0057 347/17 |
| 2014/0176641 A1 * | 6/2014 | Hawryschuk | B41J 2/16505 347/32 |
| 2014/0198162 A1 | 7/2014 | Dirubio et al. | |
| 2015/0022605 A1 | 1/2015 | Mantell et al. | |
| 2015/0085038 A1 | 3/2015 | Liu | |
| 2015/0165758 A1 | 6/2015 | Sambhy et al. | |
| 2015/0273835 A1 * | 10/2015 | Arimizu | B41J 2/16585 347/30 |
| 2015/0315403 A1 | 11/2015 | Song et al. | |
| 2015/0343797 A1 | 12/2015 | Song et al. | |
| 2015/0375474 A1 | 12/2015 | DeGolier et al. | |
| 2015/0375543 A1 * | 12/2015 | Barnett | B41J 2/04516 347/37 |
| 2016/0083609 A1 | 3/2016 | Sisler et al. | |
| 2016/0274519 A1 | 9/2016 | Lim et al. | |
| 2016/0378036 A1 | 12/2016 | Onishi et al. | |
| 2017/0282599 A1 | 10/2017 | Do | |
| 2018/0149998 A1 | 5/2018 | Furukawa | |
| 2019/0094727 A1 | 3/2019 | Landa et al. | |
| 2020/0073301 A1 | 3/2020 | Sakai et al. | |
| 2020/0361715 A1 | 11/2020 | Meier | |
| 2020/0376878 A1 | 12/2020 | Landa et al. | |
| 2021/0001622 A1 | 1/2021 | Landa et al. | |
| 2021/0053341 A1 | 2/2021 | Landa et al. | |
| 2021/0055666 A1 | 2/2021 | Landa et al. | |
| 2021/0062021 A1 | 3/2021 | Landa et al. | |
| 2021/0070083 A1 | 3/2021 | Levanon et al. | |
| 2022/0153015 A1 | 5/2022 | Landa et al. | |
| 2022/0153048 A1 | 5/2022 | Landa et al. | |
| 2022/0176693 A1 | 6/2022 | Landa et al. | |
| 2022/0188050 A1 | 6/2022 | Boris | |
| 2022/0250376 A1 | 8/2022 | Pomerantz et al. | |
| 2022/0274394 A1 | 9/2022 | Chechik et al. | |
| 2022/0288947 A1 | 9/2022 | Landa et al. | |
| 2022/0339927 A1 | 10/2022 | Landa et al. | |

FOREIGN PATENT DOCUMENTS

| | | |
|---|---|---|
| CN | 1703326 A | 11/2005 |
| CN | 1961015 A | 5/2007 |
| CN | 101096455 A | 1/2008 |

(56) References Cited

FOREIGN PATENT DOCUMENTS

| | | |
|---|---|---|
| CN | 101248146 A | 8/2008 |
| CN | 101592896 A | 12/2009 |
| CN | 101820241 A | 9/2010 |
| CN | 102341249 A | 2/2012 |
| CN | 102529257 A | 7/2012 |
| CN | 102673209 A | 9/2012 |
| CN | 104015415 A | 9/2014 |
| CN | 107879147 A | 4/2018 |
| EP | 0676300 A2 | 10/1995 |
| JP | 48043941 | 12/1973 |
| JP | 363274572 A | 11/1988 |
| JP | H05249870 A | 9/1993 |
| JP | H09174646 A | 7/1997 |
| JP | H10130597 A | 5/1998 |
| JP | 2000094660 A | 4/2000 |
| JP | 2000141883 A | 5/2000 |
| JP | 2000190468 A | 7/2000 |
| JP | 2000337464 A | 12/2000 |
| JP | 2003076159 A | 3/2003 |
| JP | 2003227549 A | 8/2003 |
| JP | 2004340983 A | 12/2004 |
| JP | 2005224737 A | 8/2005 |
| JP | 2008082820 A | 4/2008 |
| JP | 2009154377 A | 7/2009 |
| JP | 2009532240 A | 9/2009 |
| JP | 2009227909 A | 10/2009 |
| JP | 2009240925 A | 10/2009 |
| JP | 2009271422 A | 11/2009 |
| JP | 2009279808 A | 12/2009 |
| JP | 2010030300 A | 2/2010 |
| JP | 4562388 B2 | 10/2010 |
| JP | 2011064850 A | 3/2011 |
| JP | 2011168024 A | 9/2011 |
| JP | 2013104044 A | 5/2013 |
| JP | 2014008609 A | 1/2014 |
| JP | 2014073675 A | 4/2014 |
| JP | 2015202616 A | 11/2015 |
| JP | 2016074206 A | 5/2016 |
| JP | 2016179678 A | 10/2016 |
| JP | 2017093178 A | 5/2017 |
| JP | 2018017429 A | 2/2018 |
| JP | 2020014350 A | 1/2020 |
| WO | 2015026864 A1 | 2/2015 |
| WO | 2017208152 A1 | 12/2017 |

OTHER PUBLICATIONS

CN101248146A Machine Translation (EPO, PlatPat and Google) published on Aug. 20, 2008 Ricoh KK.
CN101592896A Machine Translation (by EPO and Google)—published Dec. 2, 2009; Canon KK.
CN101820241A Machine Translation (by EPO and Google)—published Sep. 1, 2010; Canon KK.
CN102341249A Machine Translation (EPO, PlatPat and Google) published on Feb. 1, 2012 Eastman Kodak Co.
CN102529257A Machine Translation (by EPO and Google)—published Jul. 4, 2012; Nippon Synthetic Chem Ind.
CN102673209A Machine Translation (by EPO and Google)—published Sep. 19, 2012; Wistron Corp.
CN104015415A Machine Translation (by EPO and Google)—published Sep. 3, 2014; Avery Dennison
CN107879147A Machine Translation (by EPO and Google)—published Apr. 6, 2018; Brother Ind Ltd.
CN1305895A Machine Translation (by EPO and Google)—published Aug. 1, 2001; Imaje SA [FR].
CN1543404A Machine Translation (by EPO and Google)—published Nov. 3, 2004; 3M Innovative Properties Co [US].
CN1703326A Machine Translation (by EPO and Google)—published Nov. 30, 2005; Nissha Printing [JP].
CN1961015A Machine Translation (EPO, PlatPat and Google) published on May. 9, 2007 Dainippon Ink & Chemicals.
Co-pending U.S. Appl. No. 17/773,609, inventors Benzion; Landa et al., filed May 1, 2022.
Co-pending U.S. Appl. No. 17/788,335, inventors Benzion; Landa et al., filed Jun. 23, 2022.
Co-pending U.S. Appl. No. 17/842,860, inventor Landa; Benzion, filed Jun. 17, 2022.
Co-pending U.S. Appl. No. 17/894,172, inventors Landa; Benzion et al., filed Aug. 23, 2022.
Co-pending U.S. Appl. No. 17/963,225, inventors Burkatovsky; Vitaly et al., filed Oct. 11, 2022.
IP.com search (Year: 2022).
JP2000094660A Machine Translation (by EPO and Google)—published Apr. 4, 2000; Brother Ind Ltd.
JP2000141883A Machine Translation (EPO, PlatPat and Google) published on May 23, 2000 Ricoh KK.
JP2000190468A Machine Translation (EPO, PlatPat and Google) published on Jul. 11, 2000 Brother Ind Ltd.
JP2000337464A Machine Translation (by EPO and Google)—published Dec. 5, 2000; Fuji Xerox Co Ltd.
JP2003076159A Machine Translation (by EPO and Google)—published Mar. 14, 2003, Ricoh KK.
JP2004117118A Machine Translation (by EPO and Google)—published Apr. 15, 2004; Nidec Copal Corp.
JP2005224737A Machine Translation (by EPO and Google)—published Aug. 25, 2005; Mitsubishi Paper Mills Ltd.
JP2006256087 Machine Translation (by EPO and Google)—published Sep. 28, 2006; Ricoh Printing Sys. Ltd.
JP2008082820A Machine Translation (by EPO and Google)—published Apr. 10, 2008; Ricoh KK.
JP2009154377A Machine Translation (by EPO and Google)—published Jul. 16, 2009; Fujifilm Corp.
JP2009227909A Machine Translation (EPO, PlatPat and Google) published on Oct. 8, 2009 Fujifilm Corp.
JP2009240925A Machine Translation (by EPO and Google)—published Oct. 22, 2009; Fujifilm Corp.
JP2009271422A Machine Translation (by EPO and Google)—published Nov. 19, 2009; Ricoh KK.
JP2009279808A Machine Translation (by EPO and Google)—published Dec. 3, 2009; Fuji Xerox Co Ltd.
JP2011168024A Machine Translation (EPO, PlatPat and Google) published on Sep. 1, 2011 Ricoh Co Ltd.
JP2013104044A Machine Translation (by EPO and Google)—published May 30, 2013; Three M Innovative Properties.
JP2014008609A Machine Translation (EPO, PlatPat and Google) published on Jan. 20, 2014 Seiko Epson Corp.
JP2014073675A Machine Translation (EPO and Google) published on Apr. 24, 2014 Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.
JP2016179678A Machine Translation (EPO, PlatPat and Google) published on Oct. 13, 2016 Xerox Corp.
JP2017093178A Machine Translation (EPO and Google) published on May 25, 2017 Samsung Electronics Co Ltd.
JP2018017429A Machine Translation (by EPO and Google)—published Feb. 1, 2018; Rinnai KK.
JP2020014350A Machine Translation (by EPO and Google)—published Jan. 23, 2020; Toshiba Mitsubishi Elec Ind.
JP48043941 Machine Translation (by EPO and Google)—published Dec. 21, 1973.
JPH10130597A Machine Translation (by EPO and Google)—published May 19, 1998; Sekisui Chemical Co Ltd.
JPS63274572A Machine Translation (by EPO and Google)—published Nov. 11, 1988; Canon KK.
Co-pending U.S. Appl. No. 17/312,394, inventors Benzion; Landa et al., filed Jun. 10, 2021.
Co-pending U.S. Appl. No. 17/382,285, filed Jul. 21, 2021.
Co-pending U.S. Appl. No. 17/382,334, inventor Landa; Benzion, filed Jul. 21, 2021.
Co-pending U.S. Appl. No. 17/414,087, inventors Benzion; Landa et al., filed Jun. 15, 2021.
Co-pending U.S. Appl. No. 17/438,497, filed Sep. 13, 2021.

(56) References Cited

OTHER PUBLICATIONS

JP2004340983A Machine Translation (by EPO and Google)—published Dec. 2, 2004; Ricoh KK.
JP2009532240A Machine Translation (by EPO and Google)—published Sep. 10, 2009; Aisapack Holding SA.
JP2010030300A Machine Translation (by EPO and Google)—published Feb. 12, 2010; Xerox Corp.
JP2011064850A Machine Translation (by EPO and Google)—published Mar. 31, 2011; Seiko Epson Corp.
JP4562388B2 Machine Translation (by EPO and Google)—published Oct. 13, 2010; SK Kaken Co Ltd.
Kiameter™ "OFS-0777 Siliconate Technical Data Sheet," Dec. 31, 2017, 5 pages. [Retrieved from the internet on Oct. 13, 2021]: https://www.dow.com/en-us/document-viewer.html?ramdomVar=6236427586842315077&docPath=/content/dam/dcc/documents/en-us/productdatasheet/95/95-4/95-435-01-xiameter-ofs-0777-siliconate.pdf.
Co-pending U.S. Appl. No. 18/117,423, filed Mar. 4, 2023.
Co-pending U.S. Appl. No. 18/137,127, filed Apr. 20, 2023.
JP2003227549A Machine Translation (by EPO, PlatPat and Google)—published Aug. 15, 2003; Xerox Corp.
JPH05249870A Machine Translation (by EPO, PlatPat and Google)—published Sep. 28, 1993; Matsushita Electric Ind Co Ltd.

\* cited by examiner

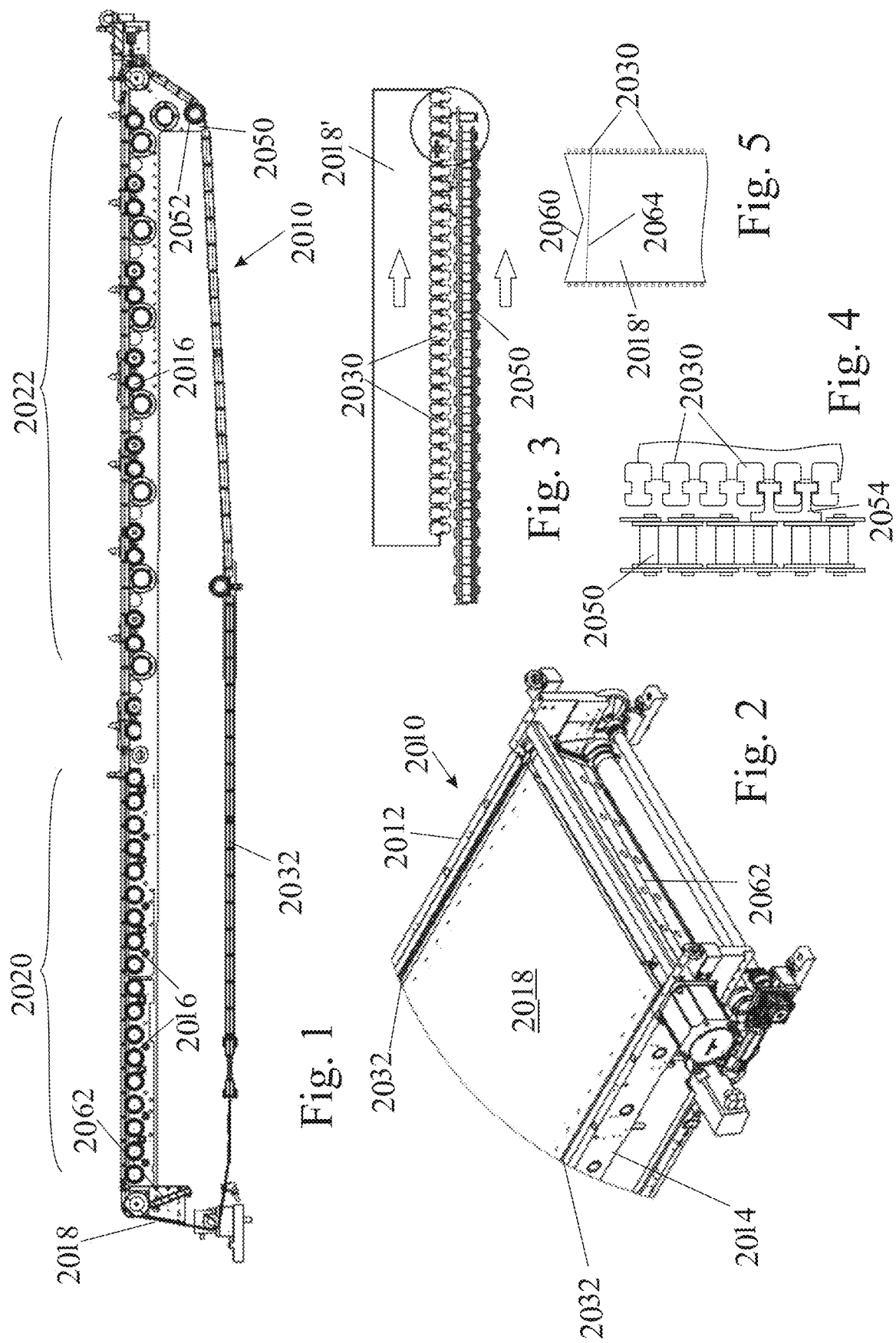

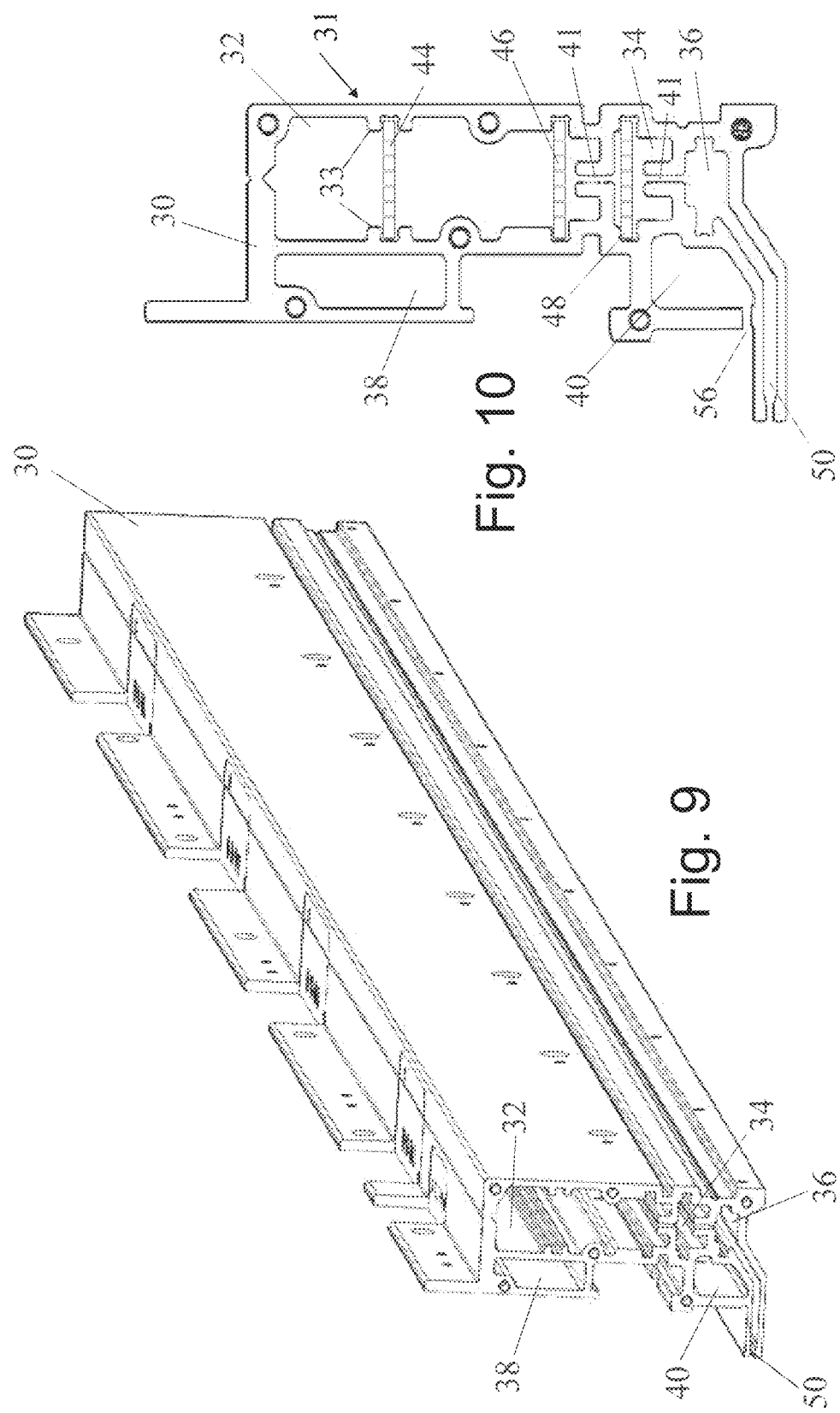

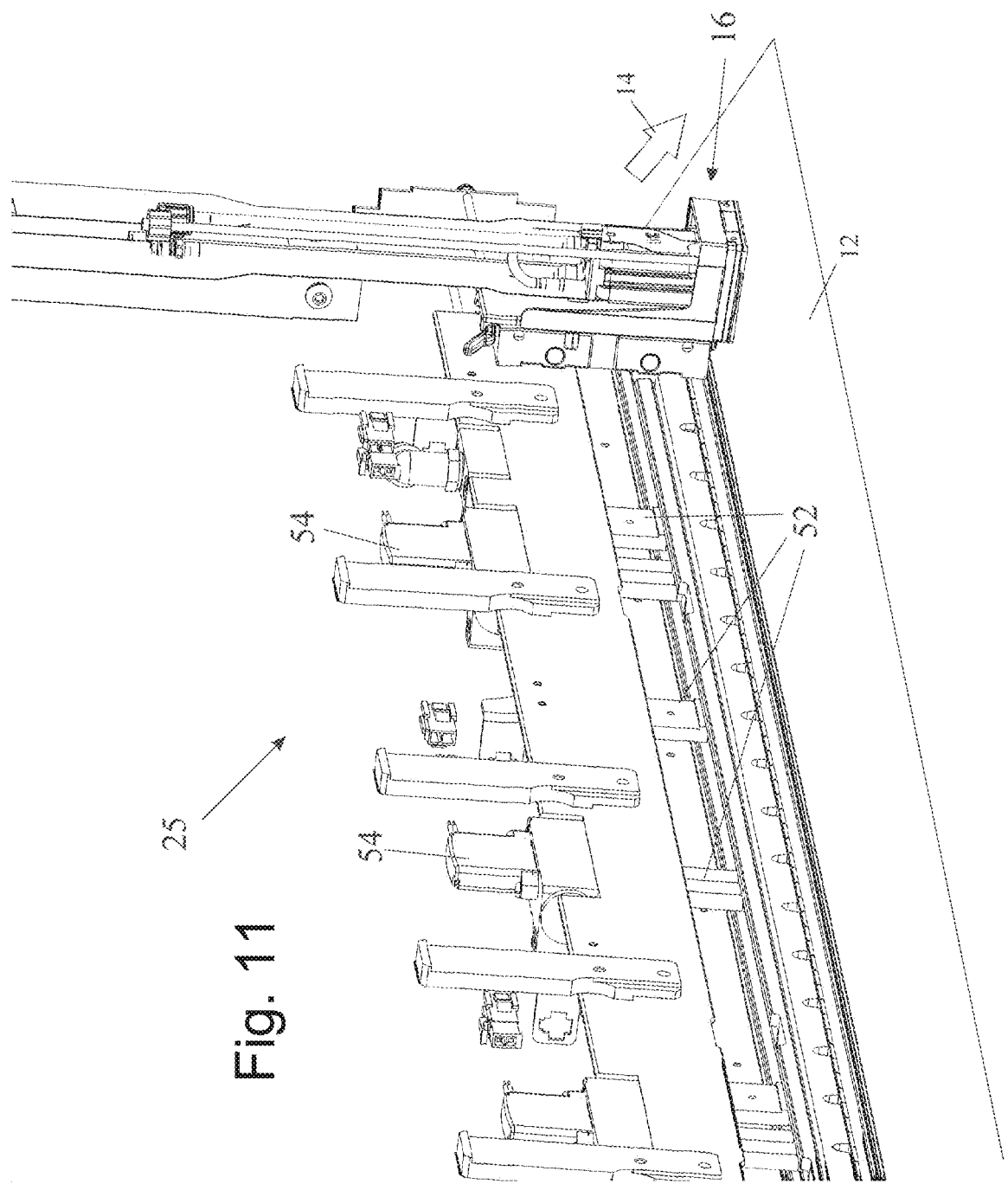

INDIRECT PRINTING SYSTEM AND RELATED APPARATUS

RELATED APPLICATION INFORMATION

The following patent applications are each incorporated herein by reference as if fully set forth herein: (i) PCT/IB2016/052120 filed on Apr. 14, 2016, (ii) U.S. application Ser. No. 15/564,198 (371 national stage entry of PCT/IB2016/052120), (iii) U.S. application Ser. No. 16/118,494 filed on Aug. 31, 2018, (iv) U.S. application Ser. No. 16/542,362 filed on Aug. 16, 2019; (v) U.S. application Ser. No. 16/244,145 filed on Jan. 10, 2019.

FIELD

Some embodiments of the invention relate to a printing system in which liquid ink droplets are deposited at an image forming station onto a movable intermediate transfer member and transferred at an impression station from the intermediate transfer member onto a printing substrate. Specifically, these embodiments disclosure pertains to an apparatus for threading the intermediate transfer member through the various stations of the printing system.

Other embodiments of the invention relate to an indirect inkjet printing system, and more specifically to an indirect inkjet printing system including a blowing mechanism for preventing condensation on the ink-heads.

BACKGROUND

First Discussion

The present Applicant has previously disclosed a printing system and process wherein images made up of inks having an aqueous carrier are jetted onto a recirculating intermediate transfer member that transports them to an impression station where they are transferred to the desired printing substrate (e.g., paper, cardboard, plastic films etc.). As against inkjet printers, that deposit ink directly onto the printing substrate, such systems allow the distance between the surface of the intermediate transfer member and the inkjet print head to be maintained constant and reduces wetting of the substrate, as the inks may be dried while being transported by the intermediate transfer member before they are transferred to the substrate. Consequently, the final image quality on the substrate is less affected by the physical properties of the substrate and benefits from various other advantages as a result of the image remaining above the substrate surface. More details of such a system are disclosed in WO2013/132418, filed on Mar. 5, 2013 and incorporated herein by reference.

Aspects of the present disclosure are concerned with an apparatus for assisting with the initial installation of the intermediate transfer member in such a printing system and with its replacement when the need arises without having to separate the various components of the printing system.

At the image forming station, the intermediate transfer member in such a printing system needs to pass through a narrow gap between the print heads and its own support and drive system, and it needs to be maintained both taut and at a fixed distance from the print heads. To achieve this, WO 2013/132418 describes in FIG. 11 how formations may be provided along the lateral edges of the intermediate transfer member that are received in guide channels having, for instance, a C-shaped cross section that is shown in FIG. 12 of the latter publication. The formations may be the teeth of two zip fastener halves, or any other type of "beads" that can properly move in the guide channels, that are attached to the respective lateral edges of the intermediate transfer member and their engagement in the guide channels serves both to constrain the path followed by the intermediate transfer member and to maintain it under lateral tension.

The intermediate transfer member is seamed once installed and starts life as a long strip, also termed a blanket in practice, but the latter term will not be used herein as it also common to refer to the installed intermediate transfer member as a blanket. The strip needs to be threaded through the various stations of the printing systems and, after it has been threaded around its entire path, its ends strip can be cut to the correct length, if necessary, and joined to one another to form a continuous loop. The ends of the strip can be attached to one another by soldering, gluing, taping (e.g., using Kapton® tape, RTV liquid adhesives or PTFE thermoplastic adhesives with a connective strip overlapping both edges of the strip), or any other method commonly known. Any method of joining the ends of the blanket strip to form an intermediate transfer member may cause a discontinuity, referred to herein as a seam.

The seam can be of different types. In particular, the edges may overlap one another or a patch may be applied to overlie the two ends. In either case, the seam may be subsequently processed, such as my grinding, to reduce its thickness.

To feed the strip into the printing system, it was proposed by the present Applicant in WO2013/136220 to provide entry points in the guide channels and to mount an external threading mechanism, shown in FIGS. 9 and 10 of the latter publication, for gripping the formations on the lateral edges of the strip and advancing its two lateral edges at the same rate into their respective guides. However, even with the aid of such a threading mechanism, it was found that the intermediate transfer member was difficult to install on account of buckling on meeting resistance or an obstruction.

It was also proposed in WO2013/136220 (see FIG. 13) to provide a loop of cable permanently housed in one or both of the tracks. The aim was to anchor the leading end of the replacement belt to the cable then to use the cable to feed the strip through the various tracks. During normal use, the cable(s) would remain stationary in the track(s) and only be rotated during installation of a new intermediate transfer member.

The use of cable loops was not found satisfactory and aspects of the present disclosure (see PCT/IB2016/052120) therefore aim to simplify the task of installing and replacing an intermediate transfer member in an indirect printing system.

Second Discussion

Aspects of present disclosure also relate to an indirect inkjet printing system, and more specifically to an indirect inkjet printing system including a blowing mechanism for preventing condensation on the ink-heads.

There has previously been proposed by the present applicant, for example in WO2013/132418 which is incorporated by reference as if fully set forth herein, a printing system in which, at an image forming station, an aqueous ink is jetted onto an intermediate transfer member (ITM), such as an endless belt or drum. The resulting ink image is transported by the ITM to an impression station and, during its transportation, it is dried to leave behind a tacky ink residue. At the impression station, the ink residue is transferred onto a substrate and the ITM surface then returns to the image forming station to commence a new printing cycle.

Certain problems have been encountered during operation of such a printing system.

First, the ITM is operated at an elevated temperature and the ink droplets start evaporating on impacting the ITM. The released water vapor then condenses on the cooler print heads and forms droplets, which eventually drip onto the ITM and damage the printed image.

Second, when a droplet is jetted by a printing nozzle, it is often followed, a short time after it has separated from the printing nozzle, by a much smaller droplet, referred to as a satellite. Being emitted sequentially while the ITM is in motion, the droplets and their satellites do not fall on the same point on the ITM and therefore result in some image dots on the substrate having a faint shadow caused by their satellites.

There is thus a need in the art for indirect inkjet printing systems which prevent condensation on the print heads and avoid satellite ink drops, so as to prevent distortion of the printed image.

One solution for the problems presented herein are described in WO2017/009722 which is incorporated by reference as if fully set forth herein.

SUMMARY

The present application discloses indirect printing systems and related apparatus.

The present section is divided into two subsections: (i) a first subsection related at least to an apparatus for threading an intermediate transfer member of a printing system (see PCT/IB2016/052120); and (ii) a second subsection related at least to an indirect printing system (see U.S. application Ser. No. 16/244,145).

First Subsection: Apparatus for Threading an Intermediate Transfer Member (ITM) of a Printing System (See PCT/IB2016/052120)

A printing system is described that has an intermediate transfer member in the form of a seamed endless belt for transporting an ink image from an image forming station, at which an ink image is deposited on the intermediate transfer member, to an impression station, where the ink image is transferred onto a printing substrate. The belt has along its edges formations of a greater thickness than the belt. The formations are received in channels to guide the belt and maintain the belt under lateral tension. Two drive members are provided, each located within a respective one of the channels. The two drive members are connected for movement in synchronism with one another and each has a respective laterally projecting gripper shaped for form locking engagement with the formations on a leading end of a strip from which the intermediate transfer member is to be formed. Rotation of the drive members during installation of a new intermediate transfer member serves to thread the strip through the printing system by pulling the strip from its leading end.

According to the embodiments of the invention (see PCT/IB2016/052120), there is provided a printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, the printing system further comprises two endless drive members, each located within a respective one of the channels, the two drive members being connected for movement in synchronism with one another and each having a respective laterally projecting gripper shaped for form locking engagement with the formations on a leading end of a strip from which the intermediate transfer member is to be formed, rotation of the drive members during installation of a new intermediate transfer member being operative to thread the strip through the printing system by pulling the strip from its leading end.

The threading mechanism differs from that disclosed in FIGS. 9 and 10 of WO2013/136220 in that the strip for forming the intermediate transfer member is pulled through the printing system by its leading end instead of being pushed from behind along its desired path. The strip is therefore maintained under longitudinal tension and thereby avoids buckling of the strip if the leading end of the strip should encounter resistance or an obstruction.

Teachings described herein (see PCT/IB2016/052120) differ from the embodiment shown in FIG. 13 of WO2013/136220 in that it uses grippers that engage the formations on the strip. This can ensure that the imaginary line extending the two grippers lies exactly perpendicular to the longitudinal axis of the strip, to avoid any tendency for the strip to be pulled towards one side or the other. Furthermore, because the grippers are capable of engaging with the formations provided on the lateral edges of the leading end of the strip, the strips may to be cut from a continuous web without any special adaptation being required for connection of the strip to the drive members used to thread it through the printing system.

In some embodiments, the drive members have the form of chains or toothed belts in place of cables. As these are driven by toothed drive wheels or cogs, slipping can be avoided and this ensures that the strip is always pulled along at exactly the same rate on its two sides.

Despite engagement of the lateral edges of the leading end of the strip in the guide channels, the leading edge of the strip may still sag at the centreline of the strip and prove hard to introduce into some of the narrow gaps through which it has to be threaded.

To assist in this task, in some embodiments of the invention, the leading edge of the strip is cut at an angle and is not perpendicular to the lateral edges of the strip.

A severely inclined leading end would need to be trimmed after it has been threaded through the printing system to avoid increasing the length of the unusable seam region of the intermediate transfer member. To minimise the wastage caused by such trimming while retaining the advantage of smoother threading, it is convenient to form the leading edge with a V-shaped cut out with two sections inclined relative to the lateral edges of the strip instead of one extending across the entire width of the strip.

After threading of the intermediate transfer member, its ends need to be trimmed to the correct length and joined to one another to form a seam. The seam preferably extends at an angle that is slightly offset from the perpendicular to the lateral edge of the strip. This angle is so that the entire width of seam, which may not have the same thickness as the remainder intermediate transfer member, should not pass at the same time over the drive rollers of the intermediate transfer member and create an abrupt change in tension in the intermediate transfer member. The angle is chosen as a compromise between avoiding such changes in tension and increasing the length of the unusable seam region.

To assist in forming the seam between the ends of the strip after it has been threaded through the printing system, a support plate may be provided in the printing system for supporting ends of the strip that are to be cut and joined to one another, the support plate not contacting the intermediate transfer member subsequent to installation of the intermediate transfer member.

Alternatively, the leading end of the strip can be transiently attached to a removable leader. The leader can have lateral formations compatible with the grippers of the drive members and can be releasably attached to the leading end of the strip. While the removable leader may be shaped as above described for the leading end, it may alternatively or additionally be made of a material less prone to sagging than the intermediate transfer member being installed. The leader can be made of a material rigid enough to allow threading of the strip through narrow gaps without interfering with adjacent parts of the printing system, but flexible enough to bend within the lateral guide channels, were curved guide channels be present along the path followed by the intermediate transfer member. In the following, and unless otherwise clear from context, the term leading end interchangeably refer to the integral leading end of the strip being installed and to the removable leader transiently attached to this end.

When a removable leader is attached to the strip, the strip may have a predetermined length and its ends may be shaped to enable the belt to have substantially the same thickness at the seam as along the remainder of its length. This may be achieved by forming a respective rebate in the rear surface of each end to receive a tape having the same width as the combined widths of the two rebates and a thickness matching the depth of the rebates. In this way, the tape used to join the two ends of the strip is recessed into the strip instead of lying above it and therefore does not cause a thickening of the intermediated transfer member at its seam.

The present application further provides a method of installing an intermediate transfer member in a printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, which method comprises providing an elongate strip of a length exceeding the circumference of the intermediate transfer member, connecting a leading end of the strip to two grippers projecting laterally from two drive members that are each disposed within a respective one of the two channels by engaging formations on a leading end of the strip with the two grippers, rotating the drive members in synchronism with one another to thread the leading end of the strip through the stations of the printing system, and joining the ends of the strip to one another to form an endless intermediate transfer member after the strip has been threaded through the printing system.

In an embodiment in which the strip has a separable leader and the ends of the strip are rebated, and joined to one another by adhering a tape within the rebates in the ends of the strip to form a seam while maintaining the uniformity of the thickness of the intermediate transfer member. By "rebated", it is meant that the thickness of the ends of the strip is reduced, such as by grinding, so as to define a recess for receiving the tape when the two ends of the strip are abutted against one another.

In accordance with a third aspect of the disclosure, there is provided a printing system having an intermediate transfer member in the form of an endless belt for transporting an ink image from an image forming station, at which an ink image is deposited on the intermediate transfer member, to an impression station, where the ink image is transferred onto a printing substrate, the belt having along its edges formations of a greater thickness than the belt, which formations are received in channels to guide the belt and maintain the belt under lateral tension, the printing system further comprising two endless drive members, each located within a respective one of the channels, the two drive members being connected for movement in synchronism with one another and rotation of the drive members during installation of a new intermediate transfer member being operative to thread a strip from which the intermediate transfer member is to be formed through the printing system by pulling the strip from its leading end, wherein opposite ends of the strip are formed with rebates for receiving a joining tape to form a seam, and are joined at a seam while maintaining the thickness of the intermediate transfer member uniform throughout its length Embodiments of the invention relate to a method of installing an intermediate transfer member in a printing system having an intermediate transfer member in the form of an endless belt for transporting an ink image from an image forming station, at which an ink image is deposited on the intermediate transfer member, to an impression station, where the ink image is transferred onto a printing substrate, which method comprises providing an elongate strip of predetermined length corresponding to the circumferential length of the intermediate transfer member, threading the strip through the printing system, providing rebates along the end edges, and joining the end edges to one another by means of tape that is recessed within the rebates and secured to the ends of the strip, so to form a seam having substantially the same thickness as the strip.

The end edges of the strip may be rebated prior to threading of the strip through the printing system and a leader may be releasably secured to one of the two rebated ends of the strip to assist in threading the strip through the printing system.

Second Subsection: An Indirect Printing System
(See U.S. application Ser. No. 16/244,145)

An indirect printing system comprising an intermediate transfer member (ITM) and an image forming station at which droplets of ink are applied to the ITM to form ink images thereon, the image forming station including a first print bar including a first plurality of print heads and having mounted thereon a first blowing mechanism for introducing a first gas flow, having a first flow rate, into a gap between the first plurality of print heads and the ITM, and a second print bar including a second plurality of print heads and having mounted thereon a second blowing mechanism for introducing a second gas flow, having a second flow rate, into a gap between the second plurality of print heads and the ITM, the second print bar being disposed downstream of the first print bar, the second flow rate being greater than the first flow rate.

In accordance with an embodiment of the present invention, there is provided an indirect printing system including:
a. an intermediate transfer member (ITM);
b. an image forming station at which droplets of ink are applied to an outer surface of the ITM to form ink images thereon, the image forming station including:
a first print bar including a first plurality of print heads spaced from the ITM by a first gap and having mounted thereon a first blowing mechanism, configured for blowing a first gas flow into the first gap in a print direction, the first gas flow having a first flow rate; and a second print bar including a second plurality of print heads spaced from the ITM by a second gap and having mounted thereon a second blowing mechanism, configured for blowing a second gas flow into the second gap in the print direction, the second gas flow having a second flow rate, the second print bar being disposed downstream of the first print bar;

c. an impression station for transfer of the ink images from the ITM onto a printing substrate; and d. a guiding system for guiding the ITM along the image forming station, and from the image forming station to the impression station, wherein the second flow rate is different from the first flow rate.

In some embodiments, the second flow rate is greater than the first flow rate.

In some embodiments, the first flow rate is sufficient to prevent condensation on the first plurality of print heads, and the second flow rate is sufficient to prevent condensation on the second plurality of print heads.

In some embodiments, a distance between the first print bar and the second print bar is in the range of 300 mm-800 mm. In some embodiments, the distance is in the range of 300 mm-400 mm. In some embodiments, the distance is in the range of 700 mm-800 mm.

In some embodiments, a difference between the second flow rate and the first flow rate is in the range of 70 L/min-220 L/min. In some embodiments, a ratio between the second flow rate and the first flow rate is in the range of 1.1-1.5.

In some embodiments, the first flow rate is in the range of 400-450 L/min. In some embodiments, the second flow rate is in the range of 600-650 L/min.

In some embodiments, the image forming station further includes:

a third print bar including a third plurality of print heads spaced from the ITM by a third gap and having mounted thereon a third blowing mechanism, configured for blowing a third gas flow into the third gap in the print direction, the third gas flow having a third flow rate, the third print bar being disposed downstream of the second print bar; and a fourth print bar including a fourth plurality of print heads spaced from the ITM by a fourth gap and having mounted thereon a fourth blowing mechanism, configure for blowing a fourth gas flow into the fourth gap in the print direction, the fourth gas flow having a fourth flow rate, the fourth print bar being disposed downstream of the third print bar, wherein at least one of the following is true:

the third flow rate is different from the second flow rate, and the fourth flow rate is different from the third flow rate.

In some embodiments, the third flow rate is greater than the second flow rate. In some embodiments, the fourth flow rate is greater than the second flow rate.

In some embodiments, none of the first flow rate, the second flow rate, the third flow rate, and the fourth flow rate, exceeds a pre-determined threshold.

In some embodiments, the third flow rate is in the range of 720-780 L/min. In some embodiments, the fourth flow rate is in the range of 820-870 L/min.

In some embodiments, at least one print head of the first plurality of print heads emits a droplet onto the ITM followed by a satellite droplet, and wherein the first flow rate is sufficient to cause the satellite droplet to merge with the parent droplet on the ITM. In some embodiments, at least one print head of the second plurality of print heads emits a droplet onto the ITM followed by a satellite droplet, and wherein the second flow rate is sufficient to cause the satellite droplet to merge with the parent droplet on the ITM.

In some embodiments, the first blowing mechanism is further adapted to introduce into the first gap a first high speed gas flow blowing in the print direction, the first high speed gas flow having at least one of a higher speed and a higher pressure than the first gas flow. In some embodiments, the first gas flow and the first high speed gas flow are emitted from a single outlet of the first blowing mechanism. In some embodiments, the first gas flow and the first high speed gas flow are emitted from two separate outlets of the first blowing mechanism.

In some embodiments, the second blowing mechanism is further adapted to introduce into the second gap a second high speed gas flow blowing in the print direction, the second high speed gas flow having at least one of a higher speed and a higher pressure than the second gas flow. In some embodiments, the second gas flow and the second high speed gas flow are emitted from a single outlet of the second blowing mechanism. In some embodiments, the second gas flow and the second high speed gas flow are emitted from two separate outlets of the second blowing mechanism.

In some embodiments, each of the first and second blowing mechanisms includes a main body defining a first chamber and a first gas flow outlet in fluid connection with the first chamber, the first chamber including at least two compartment connected by at least one slot, and at least one perforated baffle plate, such that gas flow exiting the first gas flow outlet has an even pressure along a length of the corresponding blowing mechanism. In some embodiments, the gas flow exiting the first gas flow outlet is continuous. In some embodiments, the gas flow exiting the first gas flow outlet is intermittent.

In some embodiments, the main body of each of the first and second blowing mechanisms includes a second chamber fluidly connected to a third chamber and a second gas flow outlet in fluid communication with the third chamber, the second chamber, third chamber and second gas flow outlet form a second flow path separate from a flow path formed by the first chamber and the first gas flow outlet.

In some embodiments, the second gas flow outlet of the first blowing mechanism is adapted to provide, into the first gap and in the print direction, a first stream of gas having at least one of a higher speed and a higher pressure than the first gas flow. In some embodiments, the second gas flow outlet of the first blowing mechanism is adapted to provide the first stream of gas intermittently.

In some embodiments, the second gas flow outlet of the second blowing mechanism is adapted to provide, into the second gap and in the print direction, a second stream of gas having at least one of a higher speed and a higher pressure than the second gas flow. In some embodiments, the second gas flow outlet of the second blowing mechanism is adapted to provide the second stream of gas intermittently.

In accordance with another embodiment of the present invention, there is provided a method for preventing condensation on print heads of print bars in a printing system including an intermediate transfer member (ITM), a first print bar including a first plurality of print heads spaced from the ITM by a first gap and having mounted thereon a first blowing mechanism, and a second print bar including a second plurality of print heads spaced from the ITM by a second gap and having mounted thereon a second blowing mechanism the second print bar being disposed downstream of the first print bar, the method including:

blowing, from the first blowing mechanism into the first gap in a print direction, a first gas flow having a first flow rate, thereby to prevent condensation on the first plurality of print heads; and blowing, from the second blowing mechanism into the second gap in the print direction, a second gas flow having a second flow rate, the second flow rate being different from the first flow rate, thereby to prevent condensation on the second plurality of print heads.

In some embodiments, the second flow rate is greater than the first flow rate.

In some embodiments, blowing the first gas flow includes continuously blowing the first gas flow during printing using the printing system. In some embodiments, blowing the first gas flow includes intermittently blowing the first gas flow.

In some embodiments, blowing the second gas flow includes continuously blowing the second gas flow during printing using the printing system. In some embodiments, blowing the second gas flow includes intermittently blowing the second gas flow.

In some embodiments, a difference between the second flow rate and the first flow rate is in the range of 70 L/min-220 L/min. In some embodiments, a ratio between the second flow rate and the first flow rate is in the range of 1.1-1.5.

In some embodiments, the first flow rate is in the range of 400-450 L/min. In some embodiments, the second flow rate is in the range of 600-650 L/min.

In some embodiments, the printing system further includes a third print bar including a third plurality of print heads spaced from the ITM by a third gap and having mounted thereon a third blowing mechanism, the third print bar being disposed downstream of the second print bar, and a fourth print bar including a fourth plurality of print heads spaced from the ITM by a fourth gap and having mounted thereon a fourth blowing mechanism, the fourth print bar being disposed downstream of the third print bar, and wherein the method further includes:

blowing, from the third blowing mechanism into the third gap in the print direction, a third gas flow having a third flow rate, the third flow rate being different from the second flow rate, thereby to prevent condensation on the third plurality of print heads; and blowing, from the fourth blowing mechanism into the fourth gap in the print direction, a fourth gas flow having a fourth flow rate, the fourth flow rate being different from the third flow rate, thereby to prevent condensation on the fourth plurality of print heads.

In some embodiments, the third flow rate is greater than the second flow rate. In some embodiments, the fourth flow rate is greater than the third flow rate.

In some embodiments, the third flow rate is in the range of 720-780 L/min. In some embodiments, the fourth flow rate is in the range of 820-870 L/min.

In accordance with yet another embodiment of the present invention, there is provided an indirect printing system including:

a print head for jetting ink droplets onto an intermediate transfer member (ITM) that is movable relative thereto; and a blowing mechanism for introducing gas into a gap between the print head and the ITM, the blowing mechanism including:

a first gas flow path connected to a low pressure gas supply and terminating in a first discharge outlet for delivering a continuous low speed gas stream into a gap between the ITM and the print head while ink jetting is taking place, the low speed gas stream serving to cause main droplets and satellites to merge with one another on the ITM, and a second separate gas flow path connected to a high pressure gas supply and terminating in a second discharge outlet, vertically spaced from the first discharge outlet, for intermittently delivering into the gap, at times when ink jetting is not taking place, a high speed gas stream that serves to dislodge any condensation collecting on the print head, wherein the blowing mechanism includes a main body defining a low pressure chamber connectible to a blower and communicating with the first discharge outlet, a first high pressure chamber connectible to a source of compressed gas, a second high pressure chamber in communication with the second discharge outlet and at least one valve controlling gas flow through at least one conduit connecting the first high pressure chamber to the second high pressure chamber.

In some embodiments, the indirect printing system has a plurality of print heads mounted on one side of an elongate print bar extending transversely to the direction of movement of the ITM and wherein the blowing mechanism is secured to a second side of the print bar and positioned to direct the low and high speed gas streams into the gap between the print heads and the ITM to flow parallel to, and in the same direction as, the movement of the ITM.

In accordance with a further embodiment of the present invention there is provided a blowing mechanism for introducing gas into a gap between a print head and an intermediate transfer member (ITM) of an indirect inkjet printing system, the blowing mechanism including:

a first gas flow path terminating in a first discharge outlet for delivering a continuous low speed gas stream along a print direction of the ITM; and a second separate gas flow path terminating in a second discharge outlet, vertically spaced from the first discharge outlet, for intermittently delivering a high speed gas stream into the gap along the print direction of the ITM, wherein the blowing mechanism includes an extrusion defining a low pressure chamber connectible to a blower and communicating with the first discharge outlet, a first high pressure chamber connectible to a source of compressed gas, a second high pressure chamber in communication with the second discharge outlet and at least one valve controlling gas flow through at least one conduit connecting the first high pressure chamber to the second high pressure chamber.

In some embodiments, the second high pressure chamber includes a plurality of mutually isolated sections and each section of the second high pressure chamber is connected by a respective valve and at least one respective conduit to the first high pressure chamber.

In some embodiments, the second discharge outlet is formed by a plurality of holes formed in the blowing mechanism to communicate with the second high pressure chamber.

In some embodiments, the low pressure chamber is subdivided by partitions into separate compartments, each partition being formed with a slot to allow the compartments to communicate with one another.

In some embodiments, the blowing mechanism further includes baffles that are formed separately from the extrusion and are inserted lengthwise into the low pressure chamber, to cause the gas flow from the blower to the first discharge outlet to follow a convoluted path.

In accordance with yet another embodiment of the present invention, there is provided a manifold for introducing gas into a gap between a print head and an intermediate transfer member (ITM) of an indirect inkjet printing system, the manifold having a first gas flow path terminating in a first discharge mouth for delivering a continuous low speed gas stream and a second separate gas flow path terminating in a second discharge mouth, vertically spaced from the first discharge mouth, for intermittently delivering into the gap a high speed gas stream.

In some embodiments, the gas flow path conducting the high speed gas is divided into a plurality of separate branches and high speed gas is made to flow through all the branches at different times.

In some embodiments, the entire first discharge mouth is connected to a common single first plenum chamber of the manifold that is connected at all times, during use, to a source of gas at low pressure.

In some embodiments, the second discharge mouth is divided into regions each connected to a different respective flow path branch of the manifold to receive gas at high pressure intermittently.

In some embodiments, the manifold includes a block that, in use, is directly secured to a print bar that carries the print heads.

In some embodiments, each of the branches conducting high speed gas includes a plenum chamber connected to a supply of gas at high pressure and a buffer chamber intermittently connected to the latter plenum chamber by way of a respective valve, each of the buffer chambers being connected to a respective region of the second discharge mouth of the manifold.

In some embodiments, the two discharge mouths of the manifold are defined by a top plate, a bottom plates and an intervening spacer that are secured to a low edge of the block, the first discharge mouth, for the low speed gas, being defined between the top plate and the bottom plate and the second discharge mouth, for the high speed gas, being defined by groves in the upper surface of the top plate and the underside of the block.

In some embodiments, the spacer is shaped to define divergent channels each leading to the first discharge mouth from a respective hole in the block that communicates with the single plenum chamber of the first flow path.

In the context of the present application and claims, the terms "manifold" and "blowing mechanism" are used interchangeably, and relate to a mechanical infrastructure of a mechanism for blowing a gas, which mechanical infrastructure includes at least one flow path and at least one outlet in fluid communication with the flow path, for blowing a gas, such as air, therethrough.

In the context of the present application and claims, the term "print direction" relates to a direction in which the ITM moves during printing using the printing system, and is generally along, or parallel to, the longitudinal axis of the ITM.

In the context of the present application and claims, the term "cross-print direction" relates to a direction perpendicular to the print direction, and extending from one lateral edge of the ITM to the other lateral edge of the ITM.

In the context of the present application and claims, A is "downstream" from B, if while the ITM is moving in the print direction, a specific point on the ITM reaches B before it reaches A. Stated differently, A is further along the print direction than B.

In the context of the present application and claims, A is "upstream" from B, if while the ITM is moving in the print direction, a specific point on the ITM reaches A before it reaches B. Stated differently, B is further along the print direction than A.

In the context of the present application and claims, the term "preventing condensation" relates to completely preventing condensation, but also includes reducing condensation such that the remaining condensation does not adversely impact the quality of printing and/or the quality of the printed image(s).

BRIEF DESCRIPTION OF THE DRAWINGS

The invention will now be described further, by way of example, with reference to the accompanying drawings, in which:

FIG. 1 is a section through a support system of an intermediate transfer member;

FIG. 2 is a perspective view of one end of the support system shown in FIG. 1;

FIG. 3 is a section through one of the guide channels of the intermediate transfer member with one of the drive members running alongside the formations on the lateral edges of the intermediate transfer member;

FIG. 4 is a detail of FIG. 3 drawn to an enlarged scale;

FIG. 5 shows the leading end of a strip that is threaded through a printing system to form an intermediate transfer member.

FIG. 9 is a perspective view of the main body of the blowing mechanism of FIG. 8;

FIG. 10 is a section through the main body of FIG. 9;

FIG. 11 is a view of the blowing mechanism of FIG. 8, from the side opposite to that of FIG. 8, with the support bar and all but one of the print heads removed;

Figure 6:
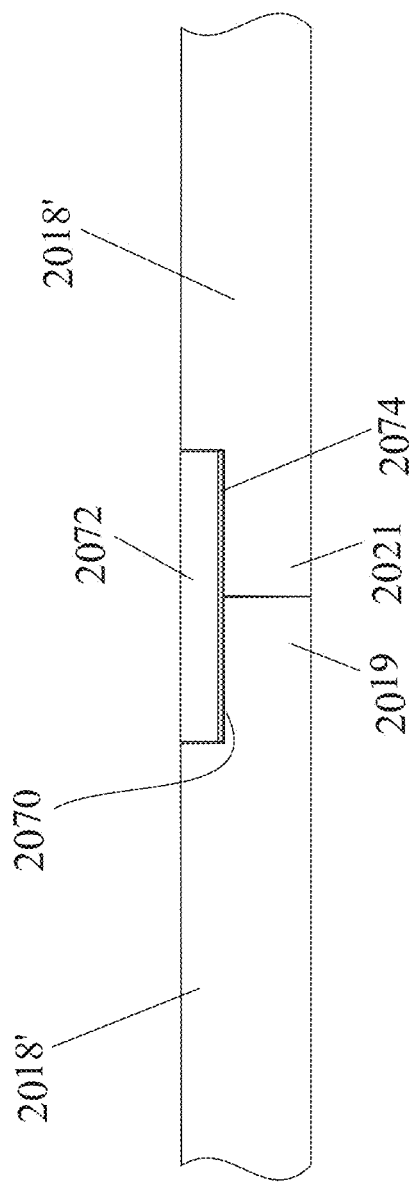
FIG. 6 shows the manner in which the ends of a strip may be joined at a seam while maintaining the thickness of the intermediate transfer member uniform throughout its length.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical components but may not be referenced in the description of all figures.

DETAILED DESCRIPTION OF THE DRAWINGS

First Subsection: Apparatus for Threading an Intermediate Transfer Member (ITM) of a Printing System (See PCT/IB2016/052120)

An intermediate transfer member support system 2010 shown in FIGS. 1 and 2 comprises two lateral frames 2012 and 2014, arranged one on each side of the intermediate transfer member 2018, and various support, drive and tensioning rollers 2016 extending transversely between the two frames 2012 and 2014 to constrain the intermediate transfer member to follow a closed loop and pass through the various stations of the printing system. The remainder of the printing system and more details of the intermediate transfer member support system are well documented in the prior art and need not therefore be repeated in the present context. Essentially, in the region designated 2020 the intermediate transfer member passes beneath an image forming station where ink is deposited on the intermediate transfer member to form an image. The intermediate transfer member rotates clockwise as viewed to carry the ink image to the region designated 2022, where the wet image is heated to evaporate the ink carrier and leave behind a tacky resin film. Along its lower run, the intermediate transfer member passes through one or more impression stations where it is pressed against a substrate, so that the tacky film separates from the intermediate transfer member and is transferred to the surface substrate.

Figure 12:
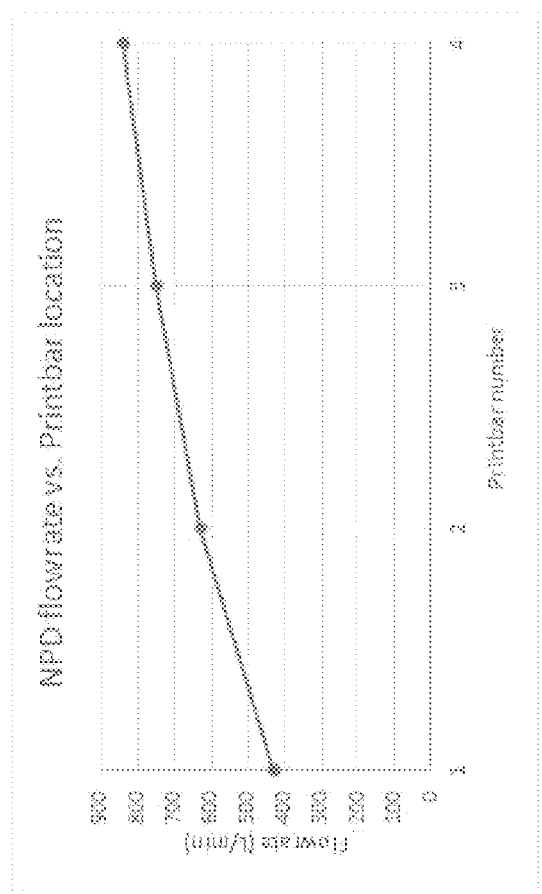
FIG. 12 is a graphic representation of the difference in the flow-rate provided at each print bar along the print direction of the system.

The intermediate transfer member support system 2010 is designed to ensure that the intermediate transfer member remains substantially flat and taut as it passes the regions 2020 and 2022 and as it approaches the nip of the impression stations. In order to achieve this objective, the edges of the intermediate transfer member 2018 have formations 2030 in the form of zipper teeth, shown in FIGS. 3 and 4, that have a greater thickness than the transfer member 2018 and are received in C-shaped guide channels 2032 secured to the lateral frames 2012 and 2014. The guide channels 2032 are shown in FIG. 1 and their position in the support system is shown in FIG. 2. Further details of the formations 2030 and the guide channels 2032 are disclosed WO2013/132418 and are shown in FIGS. 11 and 12 of that publication. It is to be understood that the guide channels may have any alternative cross section shape, as long as the lateral formations and the guide channels are compatible and suitable to guide the intermediate transfer member and maintain it under lateral tension while the printing system is operating.

The intermediate transfer member 2018 is installed by threading a strip 2018' through the printing system and connecting its ends to one another by means of a seam, in order to form a seamed endless loop. Embodiments of the invention, as previously disclosed in PCT/IB2016/052120, are concerned with simplifying this task, which needs to be carried out, not only during manufacture, but from time to time during use as the intermediate transfer member is subjected to wear.

The installation of a new or replacement intermediate transfer member 2018 is made difficult by the fact that its lateral formations 2030 need to be introduced into the guide channels 2032 and, as can be seen in FIG. 1, these need not be continuous. Because they maintain the intermediate transfer member under lateral tension, engagement of the formations 2030 in the guide channels 2032 creates drag and makes threading of the strip 2018' from which the intermediate transfer member more difficult.

To mitigate this problem, in the disclosed embodiment, two endless drive members, in the form of chains 2050 passing over sprockets 2052 are provided alongside the edges of the intermediate transfer member 2018, preferably within the enclosed cross section of the C-shaped channels 2032. Reference to chains passing over sprockets is intended herein to include the equivalent of toothed belts passing over toothed pulleys. Each of the chains 2050 has a respective laterally projecting gripper 2054, most clearly shown in FIG. 4, that engages the formations 2030 of the intermediate transfer member strip 2018' at its leading end in a form locking manner After the gripper 2054 has engaged the formations on the leading edge of the strip 2018', the two endless chains 2050 are driven to pull the strip 2018' by its leading end, in the direction shown by the arrows in FIG. 3, through the various stations of the printing system. To ensure that the two chains 2050 move in synchronism, two of their drive sprockets 2052 are mounted on a common axle that is connected either to a crank for manual operation, or to a suitable motor if threading is automated.

The intermediate transfer member 2018 may in some locations have to be threaded through a gap that is as narrow as 2 mm, while its width may typically be about 1,000 mm. Sagging of the leading edge of the strip 2018' being threaded through the printing system can therefore cause a problem. This is mitigated by forming a V-shaped cut-out 2060 in the leading edge of the strip in the manner shown in FIG. 5.

Once the strip has been pulled around the entire printing system, and its leading end comes round to the end of the support system shown in FIG. 2, the opposite ends of the strip are laid over a support plate 2062 and joined to one another to form a seam, which may, as shown in FIG. 5, extend along an inclined line 2064. After the seam has been formed, a tension roller is extended to maintain the intermediate transfer member under the desired longitudinal tension and space it from the grippers 2054 that remain stationary during operation of the printing system.

To form the seam, the two ends of the strip 2018' may be laid one over the other on the support plate 2062 and cut along the inclined line 2064. While retained on the support plate 2062 with the cut edges in abutting relation, an adhesive tape may be laid over the two ends to create the desired join. Such a method of forming the two ends results in a seam having an increased thickness and in order that it should not create a sudden change in tension as it passes over drive rollers or through an impression station, the cut line 2064 may be inclined in the manner illustrated in FIG. 5.

It is alternatively possible to form a seam without increasing the thickness of the intermediate transfer member and this is shown in FIG. 6. In this case, the strip 2018' is made to a predetermined length and is attached to a separable leader at its leading end. The leading 2019 and trailing 2021 ends of the strip 2018' proper, would be ground down to form rebates 2070 for receiving a tape 2075 that is as wide as the two rebates 2072. The tape 2072 is secured to the two ends of the strip 2018' by a layer 74 of adhesive.

In an embodiment where the thickness of the strip 2018' is about 550 μm, the rebates in the ends of the strip may have a depth of 200 μm. The rebates can then accommodate a tape having a thickness of about 150 μm leaving 50 μm for the thickness of the adhesive layer 2074.

The separable leader should be made of a flexible material so that it may follow the path of the intermediate transfer member but it may be made of a stiffer material than the strip 2018' so as to have less tendency to sag. The leader may, as shown in FIG. 5, have a V-shaped leading edge and it should have formations that are continuous with the formations on the sides of the strip 2018'.

It is understood that in addition to the image forming station and the impression station above-mentioned, a printing system may further comprise a treatment station and/or a cleaning station to respectively treat and/or clean the intermediate transfer member, a drying station to evaporate liquid carrier out of the ink image, a cooling or a heating station to modify the temperature of the intermediate transfer member along its path, a finishing station for further processing the printed substrate, and so on. All such stations need not be considered in detail in the present context.

Second Subsection: An Indirect Printing System
(See U.S. application Ser. No. 16/244,145)

The present subsection relates to an indirect inkjet printing system, and more specifically to an indirect inkjet printing system including a blowing mechanism for preventing condensation on the ink-heads.

The principles, uses and implementations of the present subsection herein may be better understood with reference to FIGS. 7-17. Upon perusal of the description and figures present herein, one skilled in the art is able to implement the invention without undue effort or experimentation. In the figures, like reference numerals refer to like parts throughout.

Before explaining at least one embodiment in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purposes and should not be regarded as limiting.

Additional objects, features and advantages of the invention will be set forth in the detailed description which follows, and in part will be readily apparent to those skilled in the art from the description or recognized by practicing the invention as described in the written description and claims hereof, as well as the appended drawings. Various features and sub-combinations of embodiments of the invention may be employed without reference to other features and sub-combinations.

It is to be understood that both the foregoing general description and the following detailed description, including the materials, methods and examples, are merely exemplary of the invention, and are intended to provide an overview or framework to understanding the nature and character of the invention as it is claimed, and are not intended to be necessarily limiting.

Figure 7:
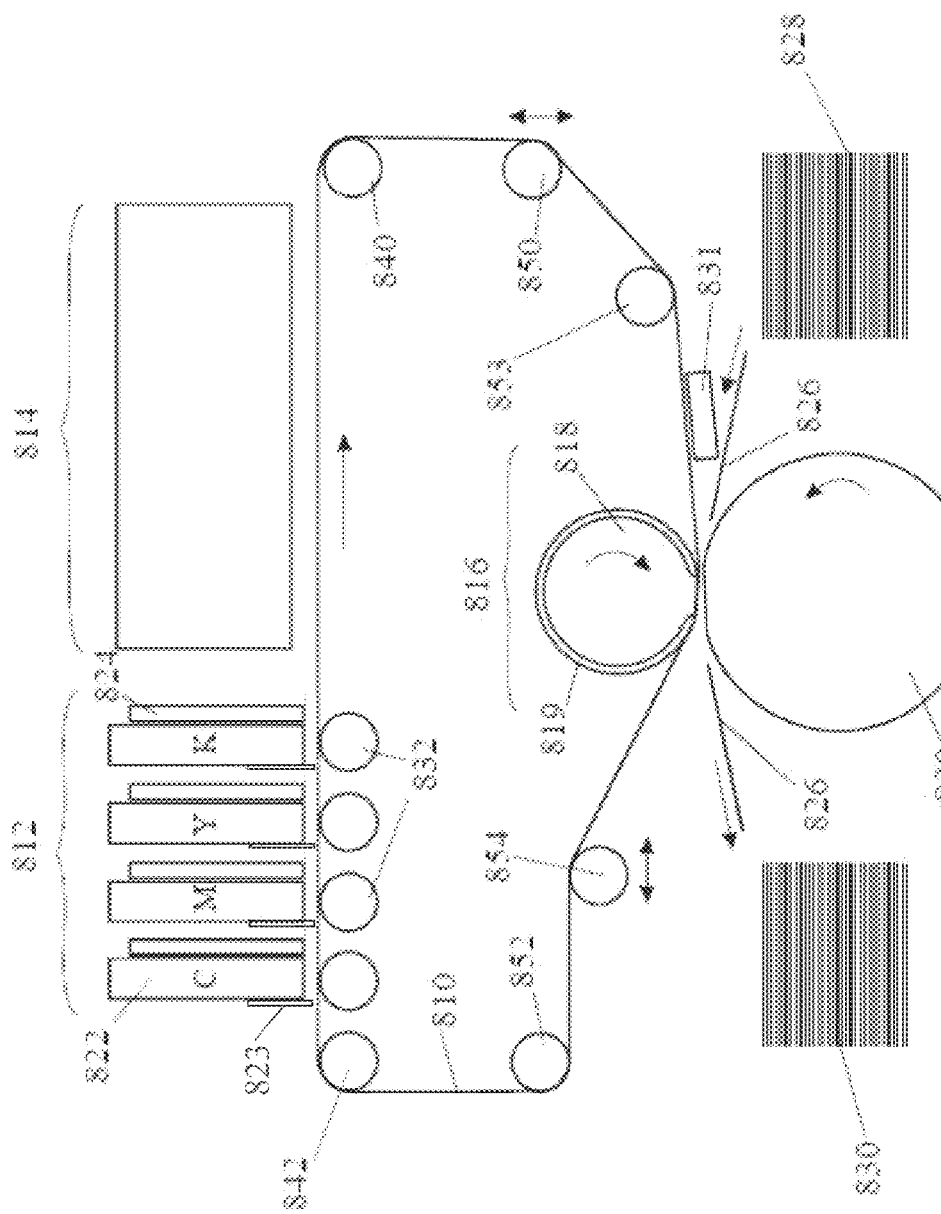
FIG. 7, which is a schematic representation of a printing system of the invention.

Reference is now made to FIG. 7, which is a schematic representation of a printing system of the invention. The printing system 800 of FIG. 7 comprises an ITM formed of an endless belt 810 that cycles through an image forming station 812, a drying station 814, and an impression station 816.

In the image forming station 812 four separate print bars 822 incorporating one or more print heads, that use inkjet technology, deposit aqueous ink droplets of different colors onto the surface of the belt 810. Though the illustrated embodiment has four print bars each able to deposit one of the typical four different colors (namely Cyan (C), Magenta (M), Yellow (Y) and Black (K)), it is possible for the image forming station to have a different number of print bars and for the print bars to deposit different shades of the same color (e.g. various shades of grey including black) or for two print bars or more to deposit the same color (e.g. black).

At least one print bar, and in the illustrated embodiment each print bar, has mounted thereon a blowing mechanism 823. The blowing mechanism 823 is adapted to blow gas through the body of the blowing mechanism 823 and into the gap between the print heads of the print bar and the ITM 810, and in the print direction, so as to prevent condensation of vapor from the jetted ink drops onto the print heads. The blowing mechanism 823 may also prevent or reduce satellite drops, which may cause distortion of the images. Two embodiments of blowing mechanisms 823 are described hereinbelow with reference to FIGS. 8-11 and with reference to FIGS. 13-17.

Following each print bar 822 in the image forming station, an intermediate drying system 824 is provided to blow hot gas (usually air) onto the surface of the belt 810 to dry the ink droplets at least partially, to leave a tacky film having the ability to adhere to the substrate when transferred thereonto in the impression station.

In the impression station 816, the belt 810 passes between an impression cylinder 820 and a pressure cylinder 818 that carries a compressible blanket 819. Sheets 826 of substrate are carried by a suitable transport mechanism (not shown in FIG. 1) from a supply stack 828 and passed through the nip between the impression cylinder 820 and the pressure cylinder 818. Within the nip, the surface of the belt 810 carrying the ink image, is pressed firmly by the blanket 819 on the pressure cylinder 818 against the substrate 826 so that the ink image is impressed onto the substrate and separated neatly from the surface of the belt. The substrate is then transported to an output stack 830.

Belt 810 typically includes multiple layers, one of which is a hydrophobic release layer, as described, for example, in WO 2013/132418 and in WO 2017/208152, which is herein incorporated by reference in its entirety.

Figure 8:
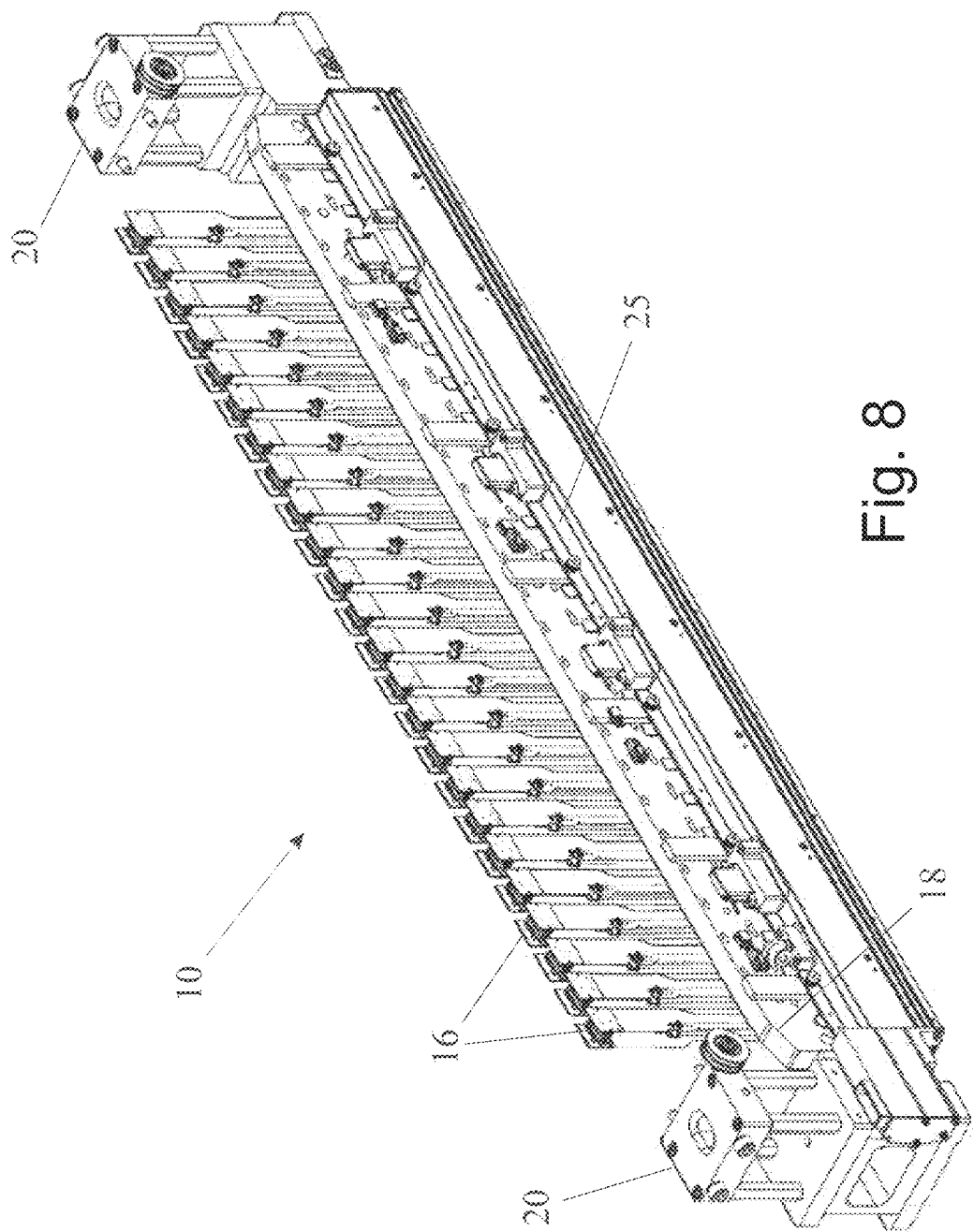
FIG. 8 is a perspective view of a print bar of the system of FIG. 7 carrying a plurality of print heads and fitted with a blowing mechanism, according to an embodiment of the present invention.

Reference is now made to FIG. 8, which is a perspective view of a print bar 10, similar to print bars 822 of the system of FIG. 7, carrying a plurality of print heads 16 and fitted with a blowing mechanism, 25, similar to blowing mechanism 823 of FIG. 7, according to an embodiment of the present invention, to FIG. 9, which is a perspective view of the main body of the blowing mechanism of FIG. 8, to FIG. 10, which is a section through the main body of FIG. 9, and to FIG. 11, which is a view of the blowing mechanism of FIG. 8, from the side opposite to that of FIG. 8, with the support bar and all but one of the print heads removed.

The print bar 10 shown in FIG. 8 carries a plurality of print heads 16 and is mounted above an intermediate transfer member 12 (shown in FIG. 11), similar to ITM 810 of FIG. 7. Typically, the print bar 10 spans most of the width of ITM 12. The print heads 16 are spaced from the ITM 12 by a small gap, and jet ink onto the ITM 12 as it moves to form an ink image. The ink image is subsequently dried and impressed on a substrate. Thereafter, the ITM is cleaned and returned to the print bar 10 to commence a new printing cycle.

The ITM 12 is an endless belt that moves in the direction of the arrow 14 in FIG. 11, also termed the "print direction", while the print bar 10 remains stationary.

According to the embodiment of the present invention illustrated in FIGS. 8-11, the print bar 10 includes a rigid support bar 18 onto which the print heads 16 are mounted.

The print heads 16 are precisely aligned in relation to one another, so as to ensure the quality of printing. In the printing system, the support bar 18 is suspended from a rail by a carriage 20, which is movable in a direction perpendicular to the direction of movement of the ITM, also termed the "cross-print direction". Such movement is required in order to provide access to the print bar 10 for the purpose of replacement and maintenance thereof.

As discussed hereinabove in the background section, two problems arise during operation of inkjet printing systems, that can affect the quality of the image ultimately printed onto the substrate.

One problem is caused by the fact that the ITM 12 is heated in order to dry the ink image and, at the time of jetting of the ink, the temperature of the surface of the ITM 12 may be near the boiling point of the solvent or carrier in the ink, which is preferably water. The carrier in the ink therefore starts to evaporate as soon as a droplet contacts the ITM 12 and the emitted vapor tends to condense on the cooler surface of the print heads 16. Such condensation can block nozzles of the print heads, and may drip onto the ITM 12 to create defects and/or distortions in the final printed image.

The other problem is caused by the structure and operation of print heads 16. Ideally, to print a dot onto the ITM 12, a print head 16 should jet a single droplet from a nozzle. In practice, oftentimes after a droplet has been released, smaller droplets, termed satellites, are ejected from the nozzle. Because the ITM 12 is in motion relative to the print heads 16, these satellite droplets do not land on the same point on the ITM 12 as their parent droplet, and create a blurred shadow or otherwise distort the image.

One solution to these problems has been proposed in the Applicant's earlier PCT application PCT/IB2016/053049, which is incorporated by reference as if fully set forth herein. In this solution, two different gas streams are introduced into the gap between the print heads 16 and the ITM 12. A low speed, uniform and laminar gas stream is blown in the print direction, so as to push the jetted droplets in the print direction. Under the force of the blown low-speed air, the smaller satellite droplets travel further in the print direction than their parent droplets, and thus land on the same point on the ITM 12, even though the parent droplets were released from the nozzles at an earlier time. A second, high speed turbulent gas stream is passed through the gap between the print heads 16 and the ITM 12, in the print direction, to remove vapor from the vicinity of the print heads 16, and prevent condensation thereon.

The Applicant has surprisingly found that a single gas stream, provided to mitigate the problem of condensation, also assists in mitigating the problem of satellite droplets, as described herein.

According to the embodiment of FIGS. 8-11, a blowing mechanism 25 is secured to the support bar 18, the blowing mechanism including a main body 30, which may be formed by extrusion, as shown in detail in FIGS. 9 and 10. As best seen from the cross-section of FIG. 9, the main body 30 includes three chambers 31, 38 and 40 that extend along the entire length of main body 30. However, in some embodiments, chambers 38 and 40 may be obviated.

In some embodiments, the chamber 31 is subdivided into three compartments 32, 34 and 36 that are connected to one another by narrow slots 41 in partition walls that separate them. The compartment 32 is connected to a gas supply and is formed with ribs 33 and grooves that are used to retain perforated baffle plates 44 and 46. The compartment 34 also has grooves for retaining a third baffle plate 48. The baffle plates 44, 46 and 48 are formed separately from the main body 30 and are slid into the grooves formed in the walls of the compartments 32 and 34 before the ends of the all the chambers are capped. The compartment 36 communicates with a gas outlet 50, also termed a mouth, that is positioned immediately upstream of the gap between the support bar 18 and the ITM 12, so as to emit gas into the gap in the print direction.

The convoluted flow path created by the slots 41 and the perforated baffle plates 44, 46 and 48, results, when a gas stream flows through chamber 31, in an even pressure along the length of the blowing mechanism 25, so that the rate of flow of gas out of the outlet 50 and into the gap between the print heads 16 and the ITM 12 is uniform across the width of the ITM 12, and is not affected by the position, along the length of the print bar, of the connection to the gas supply.

In some embodiments, the main body 30 further includes chambers 38 and 40, defining a second gas flow path, separate from the gas flow path through chamber 31 and outlet 50. Chambers 38 and 40 are upper and lower chambers that serve to provide high pressure or high speed turbulent gas streams, in the print direction. The upper chamber 38 is connected to a high pressure gas supply.

In some embodiments, the lower chamber 40 may be subdivided, by partitions inserted after extrusion of the main body 30, into separate sections in the cross-print direction that can each independently provide a gas stream to only part of the width of the ITM 12. An outlet for delivering the high pressure gas stream is formed by small holes 56 that communicate with the lower chamber 40, the outlet being divided into regions each communicating with a respective one of the transverse sections of the lower chamber 40. As such, a high speed gas stream is not provided at the same time over the entire width of the ITM 12, preventing the ITM from lifting. Additionally, because gas flows only beneath part of the print bar 10 at any one time, the power requirement placed on the high pressure gas supply is reduced.

The upper chamber 38, which is connected to the high pressure gas supply, is connected to each of the transverse sections of the chamber 40 by a respective conduit 52 (see FIG. 11). A respective valve 54 controls the flow of gas between the chamber 38 and the transverse sections of the chamber 40, so that, during operation, the sections of the lower chamber 40 may be pressurized intermittently. The holes 56 drilled into the blowing mechanism 25 allow the pressurized gas to escape from the transverse sections of the lower chamber 40 and to flow over the top surface of the outlet 50 into the gap between the ITM 12 and the print heads 16.

In use, a gas supply is connected to the chamber 31, and gas passes through the three compartments 32, 34 and 36, as well as through the baffles 44, 46 and 48, before exiting as a constant uniform laminar stream through the outlet 50 and entering the gap between the ITM 12 and the print heads 16.

As described in further detail hereinbelow with respect to FIG. 12, the speed of the gas stream may be dependent on the position of the print bar along the print direction, such that the speed of the gas stream at the fourth print bar, illustrated in FIG. 7 as the K print bar, is higher than the speed of the gas stream at the first print bar, illustrated in FIG. 7 as the C print bar. Additionally, in some embodiments, the speed of the gas stream is higher than the speed of the ITM in order to cause satellites to catch up with their parent droplets, but should not be so high as to cause satellites to overtake their parent droplets nor sufficiently high to cause turbulence and distortion of the image being printed. The pressure supplied to the chamber 31 needs therefore to be regulated so as to provide an ideal gas flow rate, as described hereinbelow with reference to FIG. 12.

The Applicants have found that a single gas flow, provided continually during printing through outlet 50, may be used to solve both problems described above, without damaging the quality of the resulting image.

However, in some embodiments, it may be advantageous to provide separate gas flows to deal with each of the problems. In such embodiments, a low speed continuous gas flow may be provided during printing via outlet 50, in the print direction, for dealing with the satellite droplets, and a second high speed gas flow may be provided via chambers 38, 40, and outlet 56, in the print direction, to prevent condensation on the print heads 16.

In such embodiments, the chamber 38 is connected to a high pressure gas supply, and the valves 54 are opened intermittently to allow high pressure gas to flow into a section of the lower chamber 40 and escape through the holes 56. In some embodiments, adjacent valves 54 are not operated simultaneously so that at no time does gas flow at high speed over the entire width of the ITM 12. In some embodiments, the valves 54 are only operated at times when ink is not being jetted onto the ITM, that is to say only between pages or between print jobs, so as to prevent turbulence of the high speed gas stream from adversely affecting the quality of the printed image.

In some embodiments, the speed of the gas required to dislodge droplets condensing on the print heads 16 via chambers 38 and 40 is significantly in excess of the speed of the constant gas flow that is used to push the satellite droplets to merge with their parent droplets. In such embodiments, the optimum pressure and gas flow rate can be determined empirically as the only requirement that it needs to meet is to ensure that it is high enough to avoid droplet condensation on the print heads 16. The optimum speed will depend on certain factors, such as the temperature of the gas and the time available between pages.

As illustrated in FIG. 7, a printing system typically includes multiple print bars 822, which are arranged in the print direction of the ITM, such that a first print bar (illustrated as the C print bar) is the first to apply ink to the ITM, a second print bar (illustrated as the M print bar) then applies additional ink to the ITM, and so on, until the last print bar (illustrated as the K print bar) applies ink to the ITM, such that the ink applied by all the print bars together forms the image being printed.

The Applicants have found that condensation on print heads of print bars which are downstream along the print direction is greater and more problematic than condensation at print bars which are the first to print. For example, in the system of FIG. 7, condensation would be more problematic on print heads of the Key print bar than on print heads of the Cyan or Magenta print bars. Stated differently, the further the print bar is from the beginning of printing or from the first print bar, the greater the problem of condensation.

The Applicants have discovered that this problem may be remedied by adjusting the flowrate and/or air speed provided by the blowing mechanisms 25 based on the position of the print bar, such that the flow rate through the blowing mechanisms in increased the further down stream the print bar is located.

As such, according to embodiments of the teachings herein, a first flow rate $FR_1$ is provided by a blowing mechanism 823 disposed on a first print bar 822 (C print bar of FIG. 1), a second flow rate $FR_2$ is provided by a blowing mechanism 823 disposed on a second print bar 822 (M print bar of FIG. 1), a third flow rate $FR_3$ is provided by a blowing mechanism 823 disposed on a third print bar 822 (Y print bar of FIG. 1), and a fourth flow rate $FR_4$ is provided by a blowing mechanism 823 disposed on a fourth print bar 822 (K print bar of FIG. 1).

According to embodiments of the disclosed technology, the further downstream the print bar, the greater the flow rate provided by the blowing mechanism disposed on the print bar, such that, $FR_1<FR_2<FR_3<FR_4$. If the size of the outlet through which the air stream is provided (outlet 50 in FIGS. 8-11) is equal in all the print bars, the air speed provided in each of the print bars increases along the print direction according to the location of the print bar, such that the air speed provided at the second print bar is greater than the air speed provided at the first print bar, the air speed provided at the third print bar is greater than the air speed provided at the second print bar, and so on.

In some embodiments, if more than four print bars are included in the printing system, the same principles may be applied to the additional print bars as well.

However, if the flow rate or air speed is too high, this may result in distortion of the image, for example by causing satellite droplets to engage the ITM beyond the parent droplets, or by pushing the main droplets out of their intended position. As such, in some embodiments, there may be an upper threshold for the flow rates provided by the blowing mechanisms. In some such embodiments, particularly when the impression station includes more than four print bars, the flow rates provided by some of the blowing mechanisms may be equal to one another, and equal to the upper threshold. For example, in embodiments in which the printing system includes seven print bars, the flow rate at the sixth print bar and the seventh print bar may be the same flow rate, and may be equal to the upper threshold. In some embodiments, the difference between the flow rate through a blowing mechanism of one print bar (e.g. $FR_2$) and the flow rate through a blowing mechanism of a second, adjacent upstream print bar (e.g. $FR_1$), is in the range of 70-220.

In some embodiments, the difference between the flow rates provided by adjacent blowing mechanisms decreases the further downstream the print bars are positioned. For example, $FR_2-FR_1>FR_4-FR_3$.

In some embodiments, the ratio between the flow rate through a blowing mechanism of one print bar (e.g. $FR_2$) and the flow rate through a blowing mechanism of a second, adjacent upstream print bar (e.g. $FR_1$), is in the range of 1.5-1.1.

In some embodiments, in which the printing system includes four print bars, the flow rate at the first print bar ($FR_1$) is in the range of 400-450 L/min, the flow rate at the second print bar ($FR_2$) is in the range of 600-650 L/min, the flow rate at the third print bar ($FR_3$) is in the range of 720-780 L/min, and the flow rate at the fourth print bar ($FR_4$) is in the range of 820-870 L/min.

As seen in FIG. 12, which is a graphic representation of the difference in the flow-rate provided at each print bar along the print direction of the system, in a printing system including four print bars having a distance of 750 mm between each pair of adjacent print bars, the flow-rate required in order to take care of condensation increases as the print bar is further downstream in the print direction.

FIG. 12 shows a graph illustrating one example of air flow rates at which little or no condensation was observed. The results illustrated in FIG. 12 are also summarized in Table 1.

TABLE 1

| Print bar number | Distance of print bar from the printing beginning point (mm) | Flowrate (L/min) | Air speed (m/s) |
| --- | --- | --- | --- |
| 1 | 0 | 430 | 2.4 |
| 2 | 750 | 630 | 3.5 |
| 3 | 1500 | 750 | 4.2 |
| 4 | 2250 | 840 | 4.7 |

Figure 13:
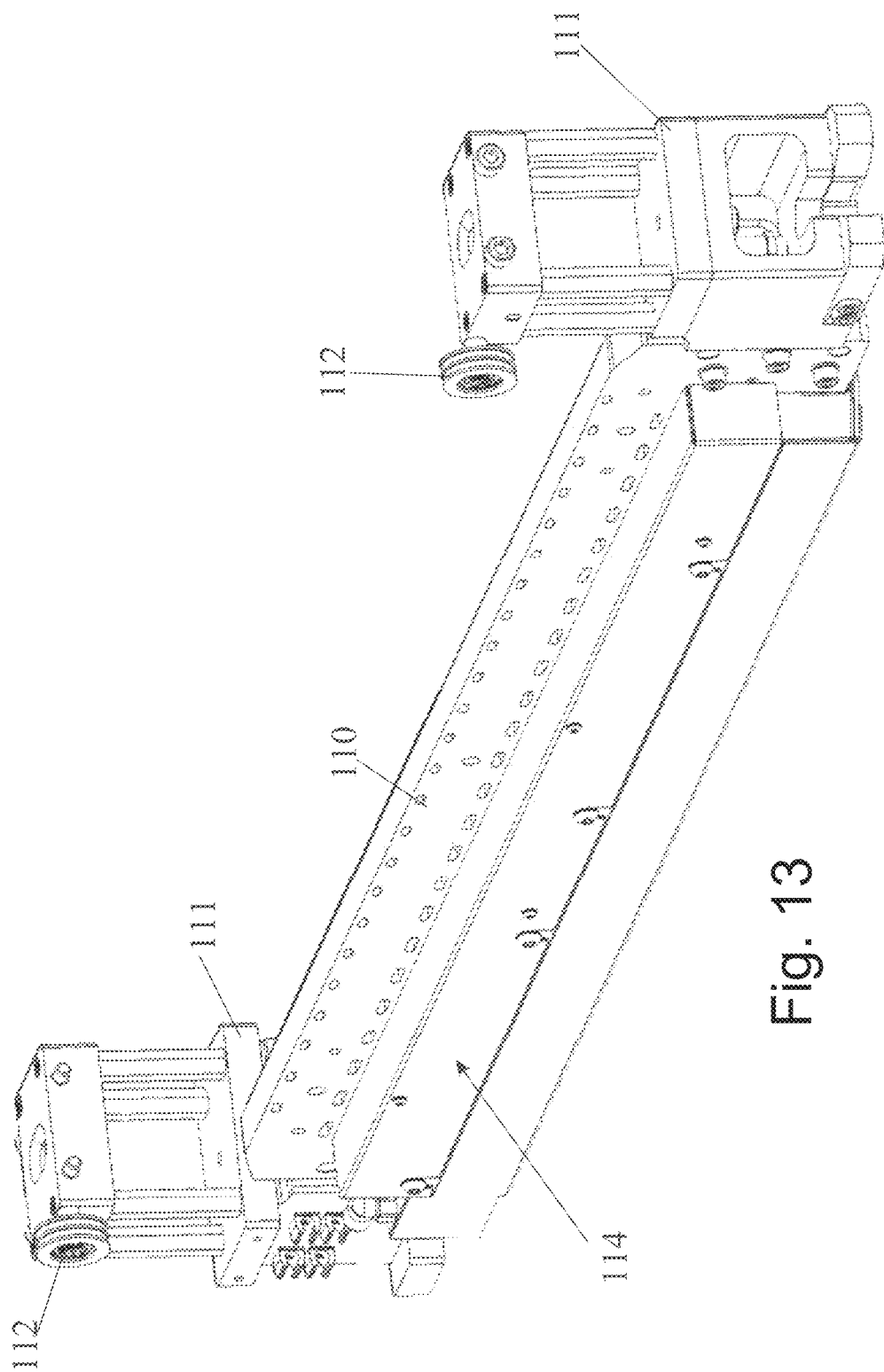
FIG. 13 is a perspective view of an assembled manifold, or blowing mechanism, secured to a print bar of the system of FIG. 7, according to another embodiment of the present invention.
Figure 14:
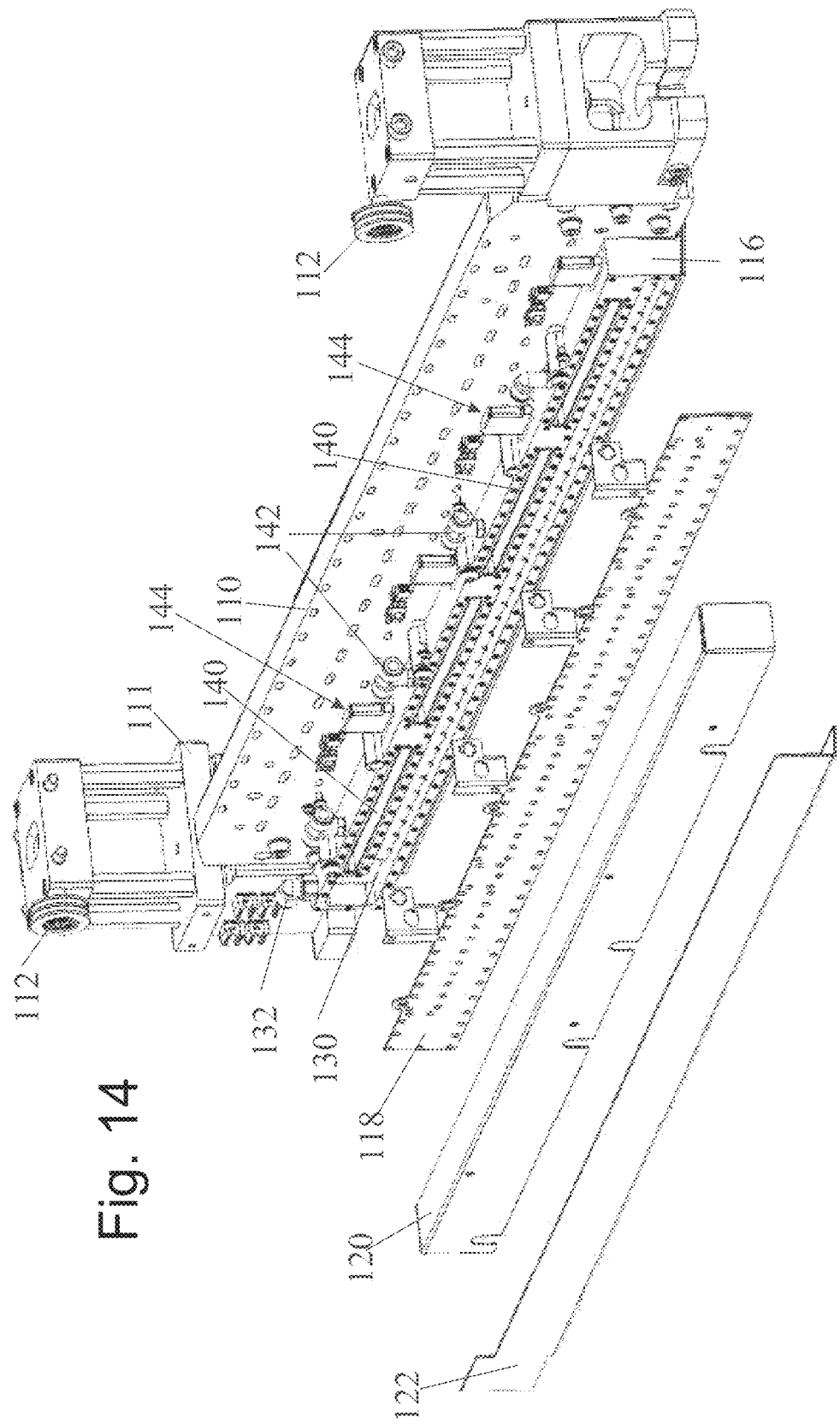
FIG. 14 is an exploded view of the manifold of FIG. 13 while still secured to the print bar.
Figure 15:
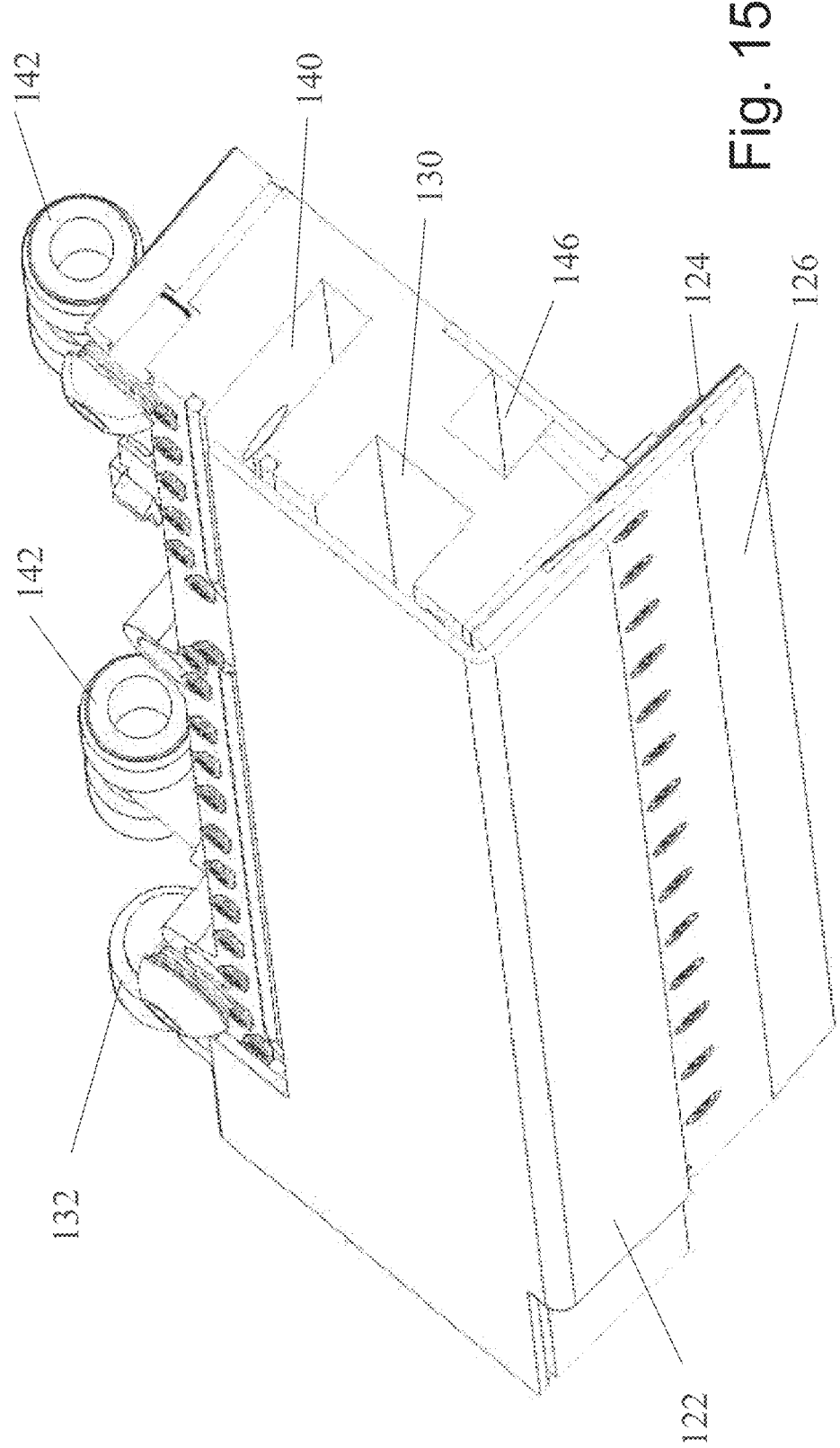
FIG. 15 shows a section through the manifold of FIG. 13 and part of the manifold when viewed from below.
Figure 16:
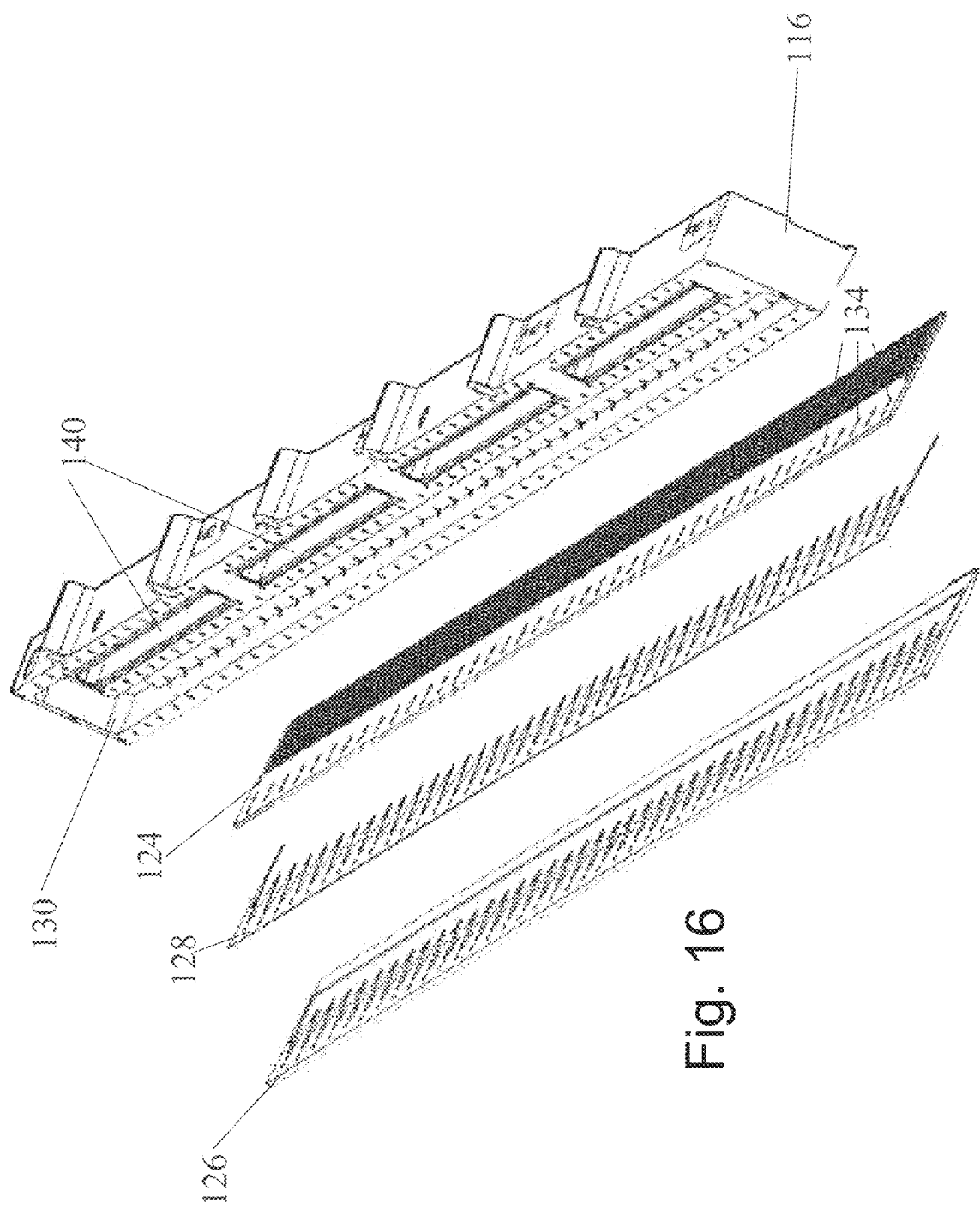
FIG. 16 is an exploded view showing the block of the manifold of FIG. 13 and plates secured to its underside to define at least one outlet for discharge of gas flow.
Figure 17:
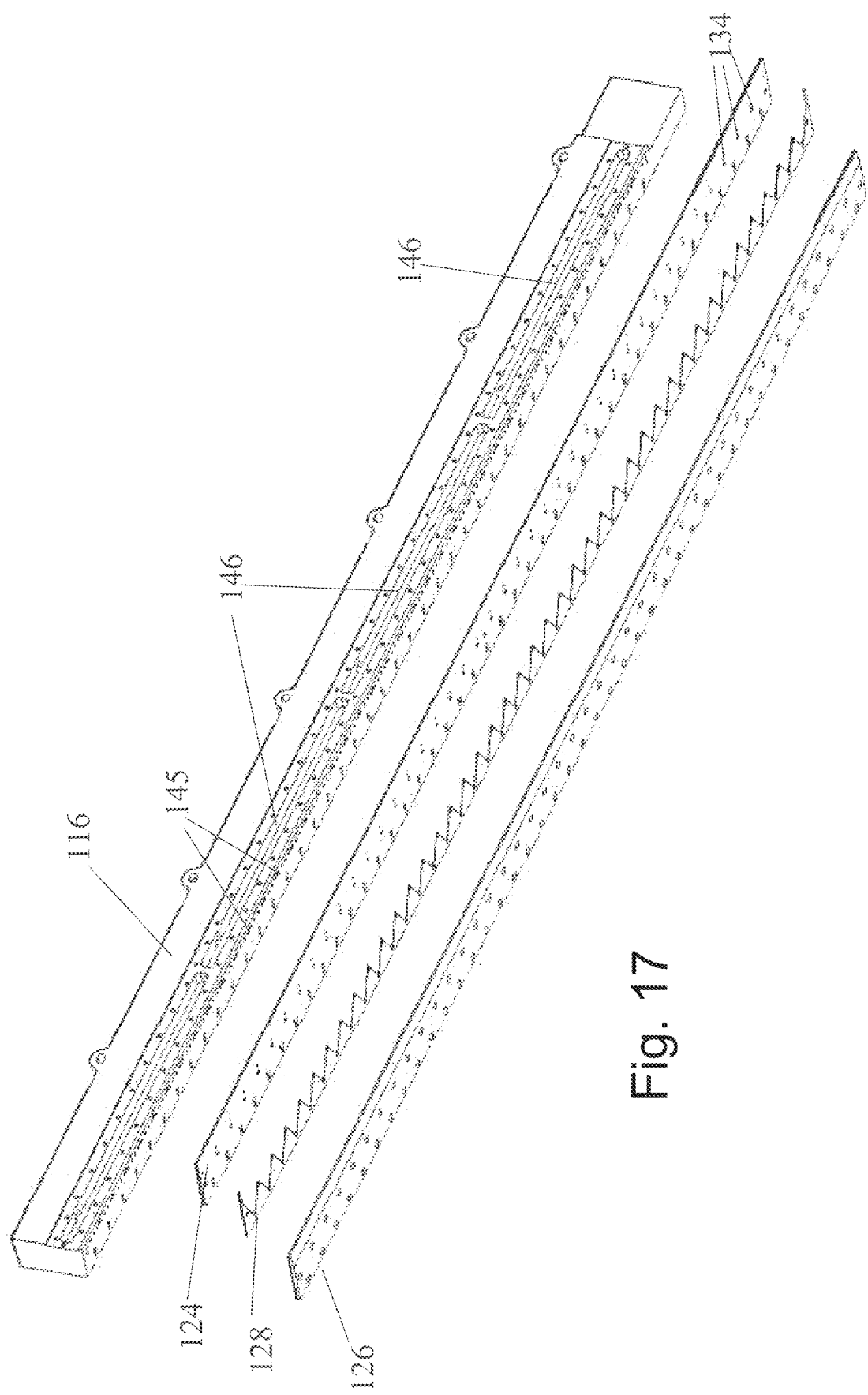
FIG. 17 is a similar exploded view to that of FIG. 16 but showing the manifold of FIG. 7 from the side facing to the print bar.

An additional embodiment of a blowing mechanism is now discussed with respect to FIGS. 13 to 17. FIG. 13 is a perspective view of an assembled manifold, or blowing mechanism, secured to a print bar of the system of FIG. 7, according to another embodiment of the present invention. FIG. 14 is an exploded view of the manifold of FIG. 13 while still secured to the print bar. FIG. 15 shows a section through the manifold of FIG. 13 and part of the manifold when viewed from below. FIG. 16 is an exploded view showing the block of the manifold of FIG. 13 and plates secured to its underside to define at least one outlet for discharge of gas flow. FIG. 17 is a similar exploded view to that of FIG. 16 but showing the manifold of FIG. 7 from the side facing to the print bar.

FIG. 13 shows a print bar 110 that is, in use, positioned immediately above the surface of an ITM having the form of a constantly recirculating endless belt. As described in WO2013/132418 and WO 2017/208152, an aqueous ink is jetted onto the surface of the ITM by print heads (not shown) mounted on the print bar 110. The resulting ink image is transported by the ITM to an impression station and during its transportation it is dried to leave behind a tacky ink residue. At the impression station, the ink residue is transferred onto a substrate and the ITM surface then returns to the print bar 110 to commence a new printing cycle.

The print bar 110 forms part of a carriage (not shown) that is supported by rollers 112 from a gantry to allow the print bar to be moved in a direction transverse to the direction of movement of the ITM between a deployed position in which it overlies the ITM and a parked position away from the ITM where servicing of print heads can take place.

A set of individual print heads (not shown) is secured to one side of the print bar 110, while a manifold 114 of the present disclosure is secured to its opposite side. The purpose of the manifold 114 is to deliver into the narrow gap between jetting nozzles of the print heads and the surface of the ITM two different gas streams. The first is a constant low speed laminar gas stream that is uniform across the width of the ITM, to cause main droplets and their satellites to merge on the surface of the ITM. The second is an intermittent high speed turbulent gas stream, to dislodge any condensation that may collect on the nozzle plates of the print heads. The second gas stream is intermittent because, being turbulent, it can only take place at times when no ink image is being formed on the ITM, so as to avoid image distortion. Furthermore, the drop in pressure caused by the high speed gas stream can lift the ITM off its support surface if applied across the entire width of the ITM at the same time and it is therefore divided in the illustrated embodiment into four separately controllable branches that can be delivered sequentially, or two at a time.

Referring to FIG. 14, the manifold 114 is formed of a rectangular block 116 having various channels machined into its opposite sides. The channels on one side are sealed by the a cover and on the other side by a closure plate 118 to form different plenum chambers for gas, usually air, under two different pressures for delivery of the low and high speed streams. The figure also shows a protective cover plate 120 and a sponge layer 122 to prevent condensation on the cover surface. A top plate 124, a bottom plate 126 and a spacer 128, best seen in the exploded views of FIGS. 16 and 17, are secured to the underside of the block 16 to define the mouths of the manifold from which the two different gas streams are discharged.

The single plenum chamber 130 for the low pressure gas used to deliver the low speed gas stream is formed by a single channel (seen in FIGS. 14 and 16 and in section in FIG. 15) that extends across the full width of the manifold 114. The plenum chamber 130 is connected to a supply of gas under low pressure (for example 0.5 bar) by a connector 132. Small vertical holes 134 in the manifold block 116 and the top plate 124 (not shown in the block but visible in the top plate 124) allow gas from the plenum chamber 130 to pass to the low speed discharge mouth of the manifold, defined between the top plate 124 and the bottom plate 126 which are separated by the spacer 128 (seen in FIG. 16). The spacer 128 has a saw-tooth shaped edge that, together with depressions formed in the top surface of the bottom plate 126, defines diverging channels leading from the above-mentioned vertical holes in the manifold block to the common discharge mouth. The divergent channels guide the gas flowing to the discharge mouth to ensure that it leaves as a laminar gas stream that is uniform over the entire width of the discharge mouth.

Gas at high pressure, for example at a pressure of 3 to 6 bar, is fed, through respective connectors 142, into four separate second plenum chambers 140 defined by the block 116 and the cover plate 118. Each of the second plenum chambers 140 is connected by a respective valve 144, and vertical holes (not shown) within the block 116, to a respective buffer chamber 146 that is arranged on the opposite side of the block 116 from the plenum chamber 140. The buffer chambers 146 are closed off by a cover and can be seen in FIGS. 15 and 17. Pressurized gas from the buffer chambers 146 passes through further vertical holes in the block 116 that open onto grooves in the top plate 124, as best shown in FIG. 16. The upper surface of the top plate 124 together with the bottom surface of the block 116 form the second discharge mouth of the manifold 114, from which high speed gas is intermittently delivered into the gap between the print nozzles and the ITM.

The plates defining the discharge mouth from which the high speed gas is discharged need to be able to withstand the high gas pressure without buckling.

In the illustrated embodiment of the invention, this problem is overcome in that the block 16 itself acts as one side of the high speed gas discharge mouth and the pressure acting on the top plate 124 is resisted not by the top plate alone but by a sandwich consisting of the top plate 124, the bottom plate 126 and the spacer 128 between them. This sandwich, which is screwed to the underside of the block 116 can have a combined thickness approaching 4 mm and can therefore readily withstand the high pressure in the buffer chamber 146. The low speed gas is discharged from between the top plate 124 and the bottom plate 126 but the latter can readily withstand the low pressure without buckling.

In use, low speed gas is constantly discharged from the mouth defined between the top plate 124 and the bottom plate 126 and the plenum chamber 130 is constantly at the pressure of the low pressure gas supply. The plenum chambers 140, on the other hand are permanently connected to the high pressure gas supply but are isolated from the buffer chambers 146. Intermittently and individually, the second plenum chambers 140 are connected to their respective buffer chamber 146 by briefly opening the associated valves 144. This results in a volume of gas being transferred into the buffer chamber 146 and stored there temporarily at high pressure. This volume then escapes through the second discharge mouth of the manifold to cause a turbulent burst of gas flowing at high speed to pass between the printing nozzles and the ITM.

The valves 144 are not all opened simultaneously to avoid lifting the ITM off its support surface. They are instead either operated sequentially, or two at a time. In the latter case, it is preferred not to open the valves of adjacent buffer chambers 146 at the same time.

The contents of all of the above mentioned applications of the Applicant are incorporated by reference as if fully set forth herein.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the present disclosure has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the appended claims and any change which come within their meaning and range of equivalency.

In the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise.

Unless otherwise stated, the use of the expression "and/or" between the last two members of a list of options for selection indicates that a selection of one or more of the listed options is appropriate and may be made.

Unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended.

To the extent necessary to understand or complete the present disclosure, all publications, patents, and patent applications mentioned herein, including in particular the applications of the Applicant, are expressly incorporated by reference in their entirety by reference as is fully set forth herein.

The invention claimed is:

1. A method for preventing condensation on print heads of print bars in a printing system comprising an intermediate transfer member (ITM), a first print bar including a first plurality of print heads spaced from said ITM by a first gap and having mounted thereon a first blowing mechanism, and a second print bar including a second plurality of print heads spaced from said ITM by a second gap and having mounted thereon a second blowing mechanism said second print bar being disposed downstream of said first print bar, the method comprising:

while the ITM is in-motion at a defined speed beneath the print bars, and while print heads of the first plurality of print heads emit droplets of ink onto the ITM, performing the following:

blowing, from said first blowing mechanism into said first gap in a print direction, a first gas flow having a first flow rate, thereby to prevent condensation on said first plurality of print heads, wherein the first blowing mechanism is controlled such that a gas speed of the first gas flow both (i) exceeds the defined speed of the in-motion ITM and (ii) matches a speed required to cause satellite droplets of ink to catch up with their parent droplets without overtaking said parent droplets; and blowing, from said second blowing mechanism into said second gap in said print direction, a second gas flow having a second flow rate, said second flow rate being different from said first flow rate, thereby to prevent condensation on said second plurality of print heads.

2. The method of claim 1, wherein said second flow rate is greater than said first flow rate.

3. The method of claim 1, wherein said printing system further includes a third print bar including a third plurality of print heads spaced from said ITM by a third gap and having mounted thereon a third blowing mechanism, said third print bar being disposed downstream of said second print bar, and a fourth print bar including a fourth plurality of print heads spaced from said ITM by a fourth gap and having mounted thereon a fourth blowing mechanism, said fourth print bar being disposed downstream of said third print bar, and wherein said method further comprises:

blowing, from said third blowing mechanism into said third gap in said print direction, a third gas flow having a third flow rate, said third flow rate being different from said second flow rate, thereby to prevent condensation on said third plurality of print heads; and blowing, from said fourth blowing mechanism into said fourth gap in said print direction, a fourth gas flow having a fourth flow rate, said fourth flow rate being different from said third flow rate, thereby to prevent condensation on said fourth plurality of print heads.

4. The method of claim 3, wherein at least one of the following is true:

said third flow rate is greater than said second flow rate; and said fourth flow rate is greater than said third flow rate.

5. The method of claim 1 wherein the first and second gas-flows are air flows.

6. A method for preventing condensation on print heads of print bars in a printing system comprising an intermediate transfer member (ITM), a first print bar including a first plurality of print heads spaced from said ITM by a first gap and having mounted thereon a first blowing mechanism, and a second print bar including a second plurality of print heads spaced from said ITM by a second gap and having mounted thereon a second blowing mechanism said second print bar being disposed downstream of said first print bar, the method comprising:

blowing, from said first flowing mechanism into said first gap in a print direction, a first gas flow having a first flow rate, thereby to prevent condensation on said first plurality of print heads; and blowing, from said second blowing mechanism into said second gap in said print direction, a second gas flow having a second flow rate, said second flow rate being different from said first flow rate, thereby to prevent condensation on said second plurality of print heads, wherein each of said first and second blowing mechanisms includes a main body defining a first chamber and a first gas flow outlet in fluid connection with said first chamber, and wherein said main body of each of said first and second blowing mechanisms includes a second chamber fluidly connected to a third chamber and a second gas flow outlet in fluid communication with said third chamber, the second chamber, third chamber and second gas flow outlet form a second flow path separate from a flow path formed by said first chamber and said first gas flow outlet.

7. The method of claim 6, said first chamber including at least two compartment connected by at least one slot, and at least one perforated baffle plate, such that gas flow exiting said first gas flow outlet has an even pressure along a length of a corresponding said blowing mechanism.

8. The method of claim 6, wherein said second gas flow outlet of said first blowing mechanism is adapted to provide, into said first gap and in said print direction, a first stream of gas having at least one of a higher speed and a higher pressure than said first gas flow.

9. The method of claim 8, wherein said second gas flow outlet of said second blowing mechanism is adapted to provide, into said second gap and in said print direction, a second stream of gas having at least one of a higher speed and a higher pressure than said second gas flow.

10. The method of claim 6 wherein gas flow exiting said first gas flow outlet has an even pressure along a length of a corresponding said blowing mechanism.

11. A method for preventing condensation on print heads of an array of print bars in a printing system comprising an intermediate transfer member (ITM), the array of print bars comprising a first print bar, a second print bar adjacent to and downstream of the first print bar, a third print bar adjacent to and downstream of the second print bar, a fourth print bar adjacent to and downstream of the third print bar, a fifth print bar downstream of the fourth print bar, and a sixth print bar adjacent to and downstream of the fifth print bar, each of the first through sixth print bars having mounted thereon a respective blowing mechanism and including a respective plurality of print heads which respectively emit droplets of ink onto the ITM, the method comprising:

while the ITM is in-motion beneath the print bars, and while print heads of the each of the print bars emit droplets of ink onto the ITM such that some of the droplets of ink are satellite-droplets which each follow a respective parent-droplet, respectively operating each of the blowing mechanisms to blow gas in said print direction and into respective gaps beneath each of the print bars and above the ITM, wherein:

i. the respective blowing of gas by each of the first through sixth blowing mechanisms respectively prevents condensations on print heads of each of the first through sixth print bars;

ii. for the first through fourth gas-flow rates, each gas-flow rate is greater than its immediate predecessor;

iii. a ratio between the second and first gas-flow rates is at least 1.1;

iv. both of the fifth and sixth gas-flow rates exceed the fourth gas-flow rate; and v. the sixth and fifth gas-flow rates are equal both to each other and to a threshold value, said threshold value being set as a maximum flow-rate permitted so that no satellite droplet engages past its parent.

12. The method of claim 11 wherein at least one of the gas-flow rates provides a gas speed which exceeds the defined speed of the in-motion ITM.

13. The method of claim 12 wherein each of the first through sixth gas-flows are air flows.

14. The method of claim 11 wherein each of the first through sixth gas-flows are air flows.

15. The method of claim 11 wherein a ratio between the fourth and third gas-flow rates is less than a ratio between the third and second gas-flow rates.

16. The method of claim 15 wherein a ratio between the third and second gas-flow rates is less than a ratio between the second and first gas-flow rates.

* * * * *